May 4, 1965 G. BECKER 3,181,784
BUSINESS MACHINE HAVING A CONTROL DEVICE FOR THE
AUTOMATIC CONTROL OF TOTALIZING MACHINE RUNS
Filed Jan. 30, 1962 24 Sheets-Sheet 11

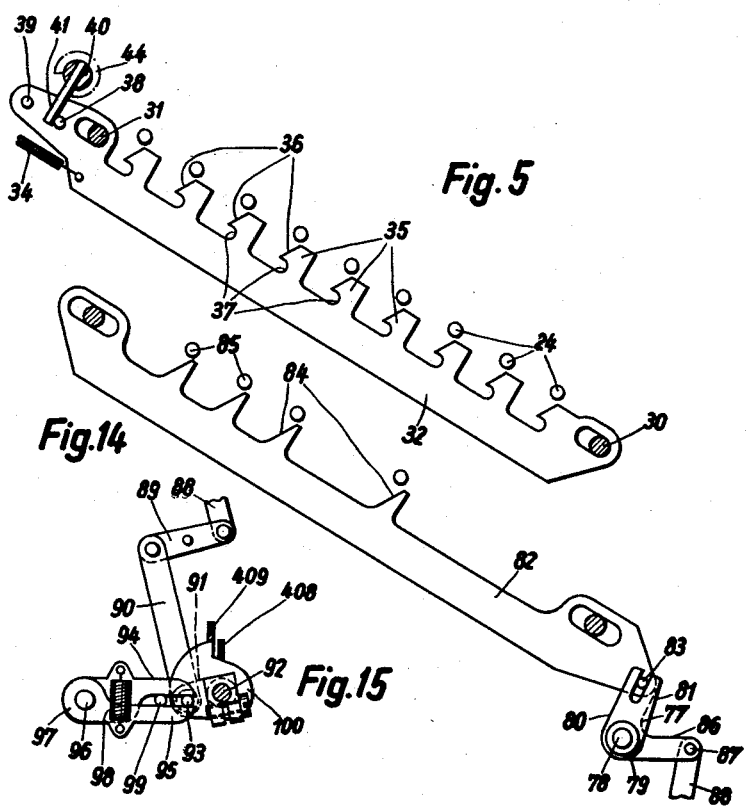

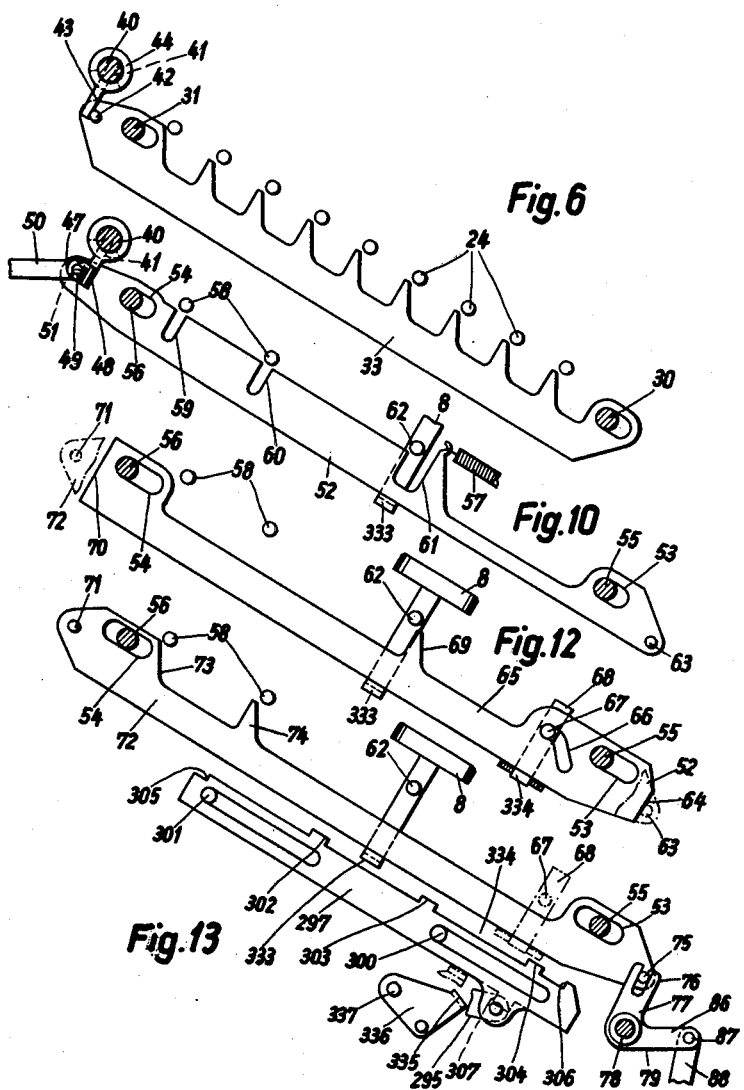

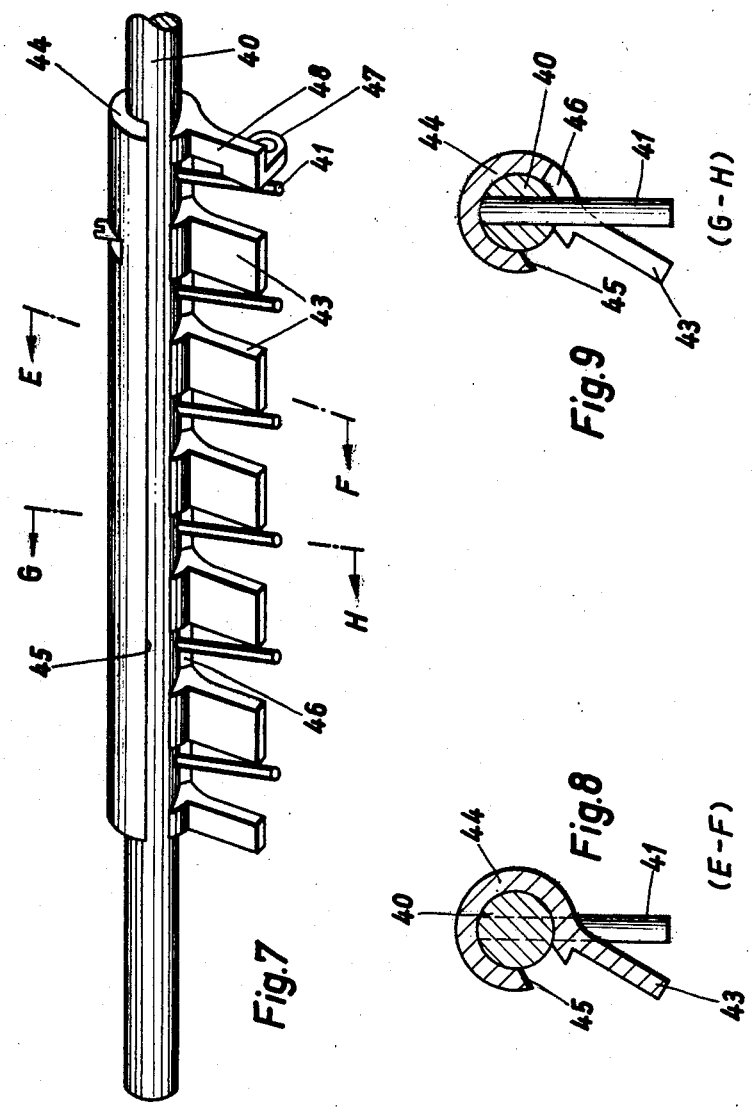

May 4, 1965   G. BECKER   3,181,784
BUSINESS MACHINE HAVING A CONTROL DEVICE FOR THE
AUTOMATIC CONTROL OF TOTALIZING MACHINE RUNS
Filed Jan. 30, 1962   24 Sheets-Sheet 14

```
6Jan₆₀  1  *002.45 K
6Jan₆₀  2  *002.50 R
6Jan₆₀  3  *004.25 G
6Jan₆₀  4  *005.12 F
6Jan₆₀  5  *001.75 R
6Jan₆₀  6  *006.48 F
6Jan₆₀  7  *003.00 R      ⎤ 260
6Jan₆₀  8  *004.65 K
─────────────────────
6Jan₆₀  9  *032.20 To
6Jan₆₀     *050.00 Za
─────────────────────
6Jan₆₀     *017.80 Rü
─ ─ ─ ─ ─ ─ ─ ─ ─ ─ ─

6Jan₆₀     x022.95 T%
```

Fig. 19

```
6Jan₆₀  1  *002.45 K
6Jan₆₀  2  *002.50 R
6Jan₆₀  3  *004.25 G
6Jan₆₀  4  *005.12 F
6Jan₆₀  5  *001.75 R
6Jan₆₀  6  *006.48 F
6Jan₆₀  7  *003.00 R      ⎤ 261
6Jan₆₀  8  *004.65 K
─────────────────────
6Jan₆₀  9  *032.20 To
6Jan₆₀     *050.00 Za
─────────────────────
6Jan₆₀     *017.80 Rü
```

Fig. 20

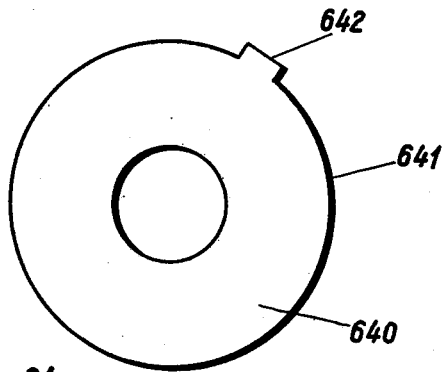

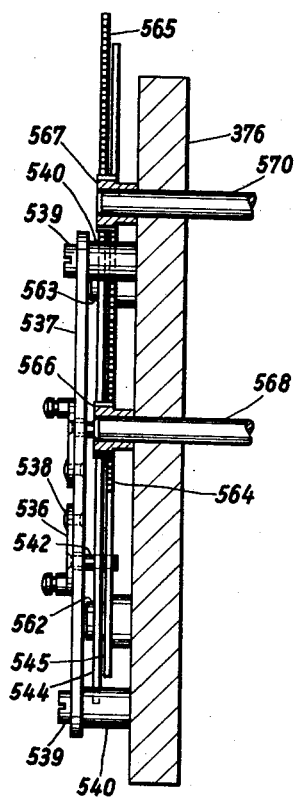
Fig.29 (C-D)
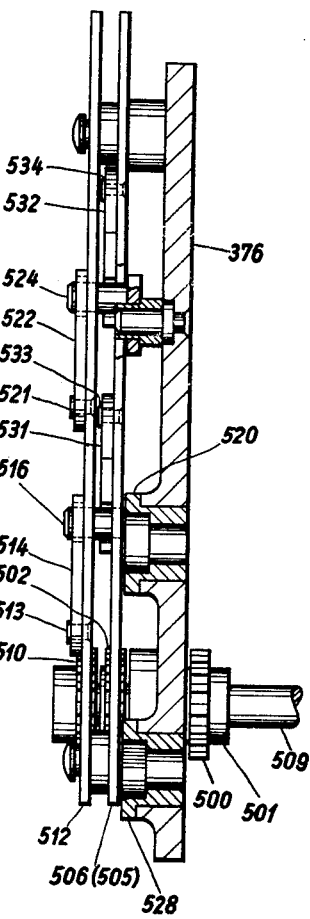
Fig.28 (A-B)

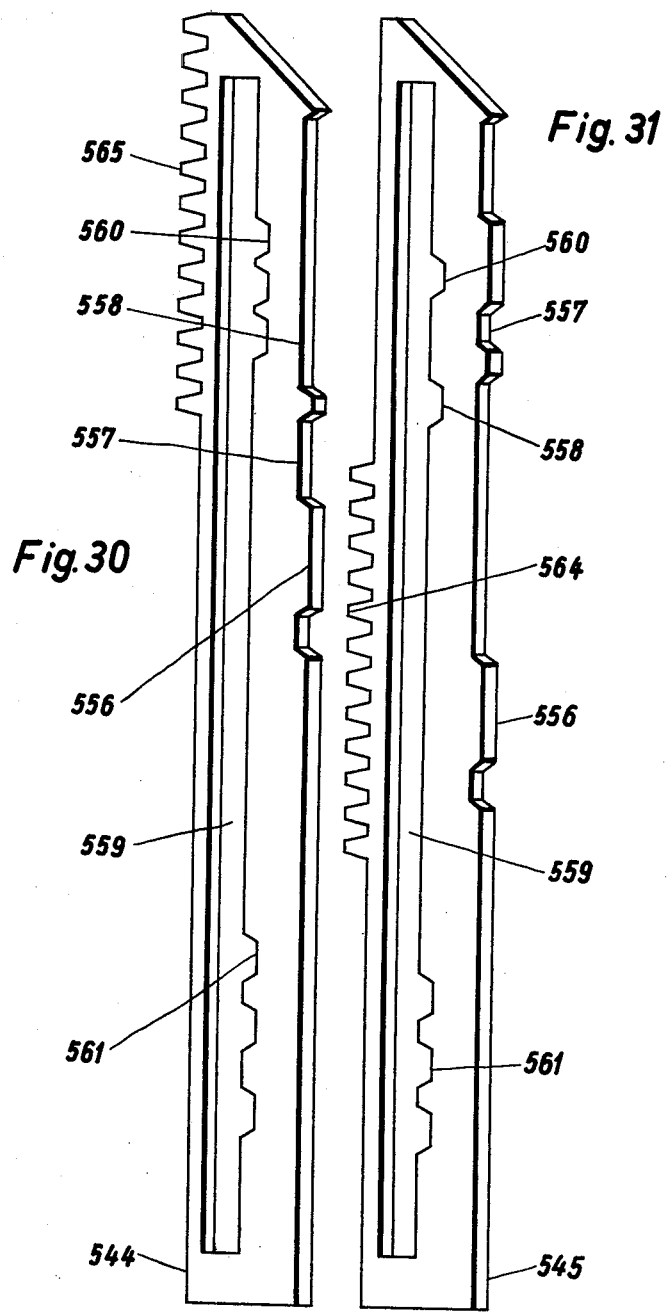

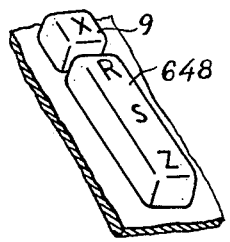
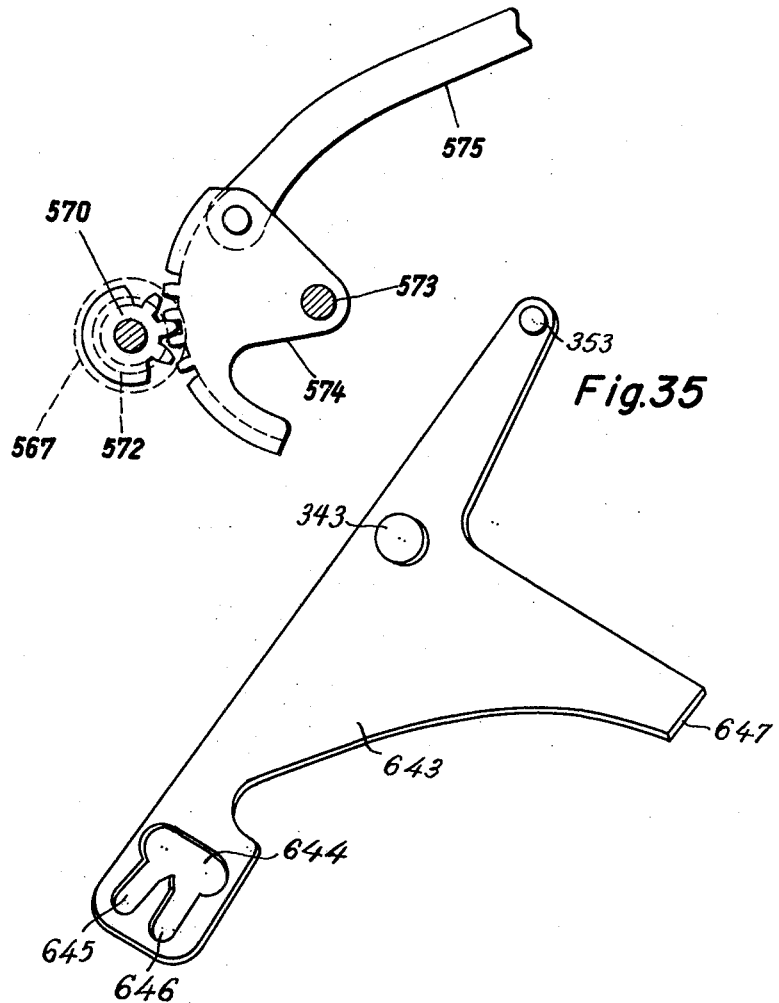

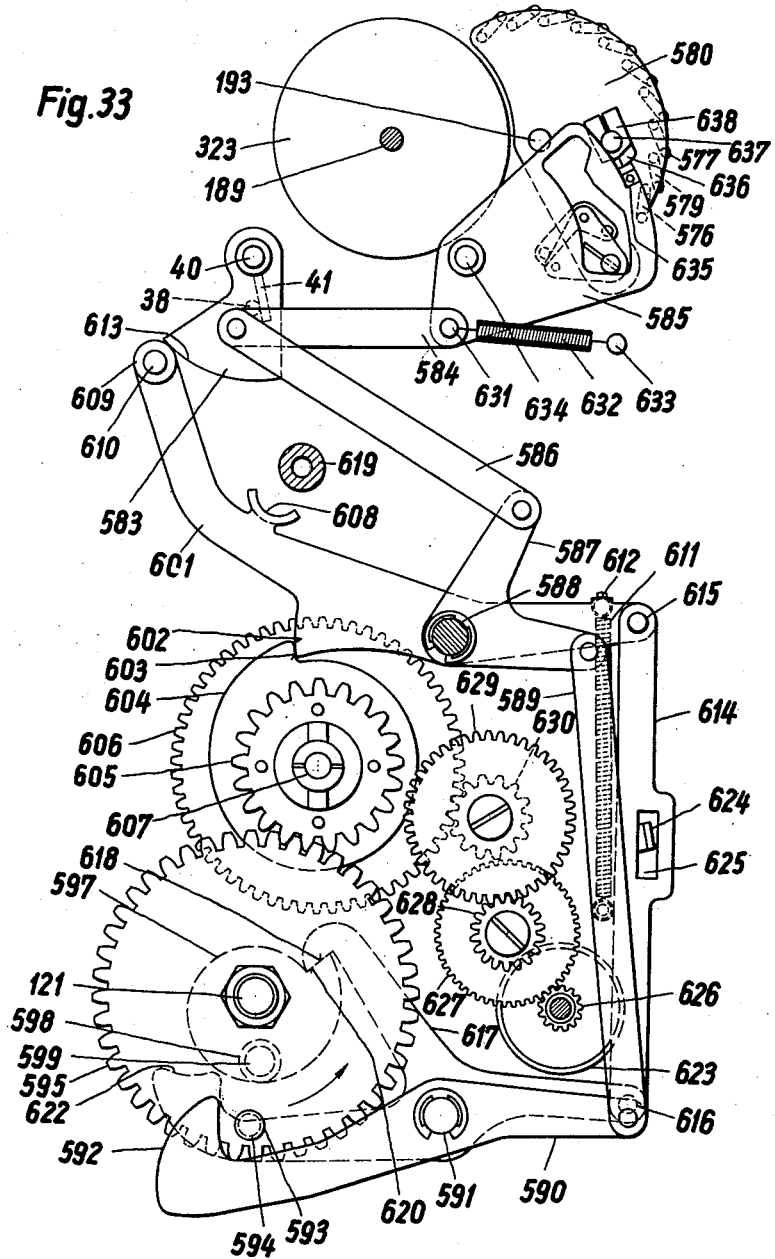

United States Patent Office 3,181,784
Patented May 4, 1965

3,181,784
BUSINESS MACHINE HAVING A CONTROL DEVICE FOR THE AUTOMATIC CONTROL OF TOTALIZING MACHINE RUNS
Gerhard Becker, Bielefeld, Germany, assignor to Anker-Werke Aktiengesellschaft, Bielefeld, Germany, a corporation of Germany
Filed Jan. 30, 1962, Ser. No. 169,761
Claims priority, application Germany, Feb. 3, 1961, A 36,645
23 Claims. (Cl. 235—2)

My invention relates to cash registers, accounting machines and other business machines for registering, computing and transaction-recording purposes and, in a more particular aspect, to those control devices which in such a machine determine the selection of a particular mode of operation to be performed as a step of a more comprehensive business-transaction performance.

My invention, in some of its aspects, is related to the machines disclosed in the copending application Serial No. 635,713, filed January 23, 1957 by G. Becker et al. and in my copending applications Serial No. 86,878, filed February 3, 1961, Serial No. 24,485, filed April 25, 1960, and Serial No. 67,438, filed November 4, 1960, all assigned to the assignee of the present invention.

In a known cash register comprising an adding-subtracting computer mechanism, the entering of the old balance and of the new transaction to be registered is each time followed by a machine run which, by means of a member contrainedly displaced during the preceding machine operations, automatically draws from the computer mechanism, an algebraic sum of the old balance and the new transaction entered during the preceding machine operations.

Known is also an accounting machine which has rows of adding mechanisms as well as a computer designed as an adding-subtracting mechanism correlated to a multiplicity of control keys whose selective manual actuation has the effect of correspondingly selecting either an individual adding mechanism or the computer mechanism or a given mode of operation, the selected machine operation being thereafter released under control by a separate motor key. The control keys of this machine serve to enter a transaction into an account and to immediately subsequently effect an automatic registering of the new balance. During this performance the blocking of the registers in the machine is automatically eliminated prior to termination of the adding-mechanism operation for the purpose of registering the change in the account, so that after the adding mechanism has completed the operation required for entering the new transaction, there immediately occurs the sum-drawing operation for determining the new balance. There is also a known balance-drawing machine in which the drawing of the new balance, concluding each accounting operation, takes place automatically subsequent to the machine run that serves for entering the old balance and is selected by control keys or by other control means and then released by a motor key.

While the first one of the above-mentioned two accounting machines is suitable, after entering the old balance, for registering a single positive (credit) or negative (debit) transaction with a subsequent automatic registering of the new balance under control by power derived from the main drive shaft, the second accounting machine mentioned above affords, after entering the old balance, the successive posting or entering of a sequence of transaction items under control by a control key as well as by the motor key. However, when posting the last item it is necessary to depress not only the motor key but also the one control key that selects the proper adding mechanism as well as the proper mode-of-operation control key, i.e. the "balance" (or "grand total") key. In the last-mentioned machine, a number of transactions are entered by means of a control key and the motor key, and the subtotal is determined by depressing a particular mode control key, namely the "subtotal" key. Thereafter the old balance is registered under control by another control key and by actuation of the motor key, whereafter an automatically releasable machine run takes place without interruption for determining the new balance.

However with the known automatically acting control and releasing devices it is only possible to operate with a fixed mode-of-operation sequence, namely to continue and terminate an amount-entering run of the machine by an immediately following, automatically releasable balance drawing (totalizing) run.

It is an object of my invention to devise an automatic control device in machines of the above-mentioned kind which affords an automatic but nevertheless selective operation in different mode-of-operation sequences, preferably in discriminatory dependence upon the type or computed result of the transactions previously processed in the machine.

To this end, and in accordance with my invention, relating to cash registers, accounting machines, calculating machines or the like, that comprise a device for controlling a sum-drawing machine run which, under manual or automatic control, follows a preceding addition operation of the machine, I provide this control device with discriminating control means which selectively determine the mode "subtotal" or "balance" for one or more subsequent machine operations, preferably for those machine runs that follow an adding-mechanism operation in the machine.

Such a control device according to my invention pursues the further object and achieves the further advantage that machines are no longer required to operate in accordance with a predetermined rigid sequencing scheme but, become capable of completing an initiated registering operation composed of several business transactions, by selecting, from the available modes of operation for the drawing of a subtotal or final balance, the one operation required for continuance or completion of the subsequent machine performance. Such a discriminating automatic selection of one of the available modes of operation for one or more subsequent machine runs offers novel possibilities for the solution of control problems in the design and manufacture of registering and calculating business machines that hertofore could be solved only by the additional provision of manual control means. The elimination of such additional manual control means by virtue of the invention results in a considerable simplification of the posting field of the machine, thus greatly simplifying the amount of service and attention required of the attending personnel and thereby also minimizing the possibility of human errors.

Although it is known for change-computing cash registers to effect the release of a selected one among several totalizing keys by actuating the "change" key, the device known for this purpose requires not only a multiplicity of control keys but also an additional blocking device for the purpose of preparing the machine for the subsequent, manually releasable final balance-drawing run.

Further objects, advantages and features of my invention, said features being set forth with particularity in the claims annexed hereto, will be apparent from, and will be mentioned in, the following with reference to two embodiments of change computing cash registers according to the invention illustrated by way of example on the accompanying drawing; in which FIGS. 1 to 33 relate to one and the same machine, and FIGS. 34 to 36 show modified components of another machine otherwise similar to that of FIGS. 1 to 33. Both machines are cash registers partly similar to those illustrated and described in my copending application Serial No. 86,878 mentioned above.

FIG. 5 shows a latching slider of the amount-key bank in lateral view.

FIG. 6 shows a control slider of the amount-key bank in lateral view.

FIG. 7 is a perspective illustration of the releasing and control shaft of the same cash register.

FIG. 8 is a section along the line E–F in FIG. 7.

FIG. 9 is a section along the line U–H in FIG. 7.

FIG. 10 shows a control slider of the mode-control bank.

FIGS. 12 and 13 show two other control sliders, respectively, of the mode-control bank.

FIG. 14 is a lateral view of a bank slider for selection of the adding mechanism.

FIG. 15 shows control details including a selector disc for the computer mechanisms.

FIGS. 19 and 20 show respective examples of checks printed by the printing mechanism.

FIG. 28 is a section along the line A–B of FIG. 25.

FIG. 29 is a section along the line C–D of FIG. 25.

FIGS. 30, 31 and 32 illustrate respective details of the adding-mechanism selector device.

FIG. 33 shows the machine drive by a lateral view seen from the rear side of the assembly shown in FIG. 11, i.e. from the side behind the plane of illustration of FIG. 11.

FIGS. 34 and 35 show respective details of a modified embodiment; and

FIG. 36 is a perspective view of part of the keyboard field of the modified machine.

*Key banks and machine-run control means*

Figure 1:
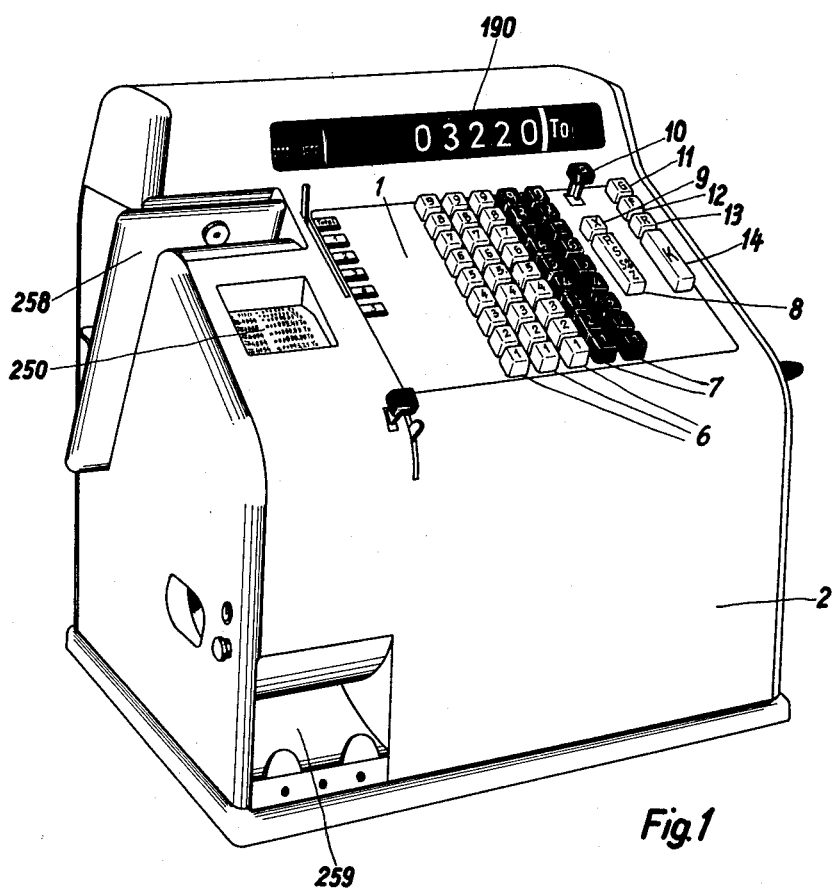
FIG. 1 shows a cash register in perspective view.
Figure 2:
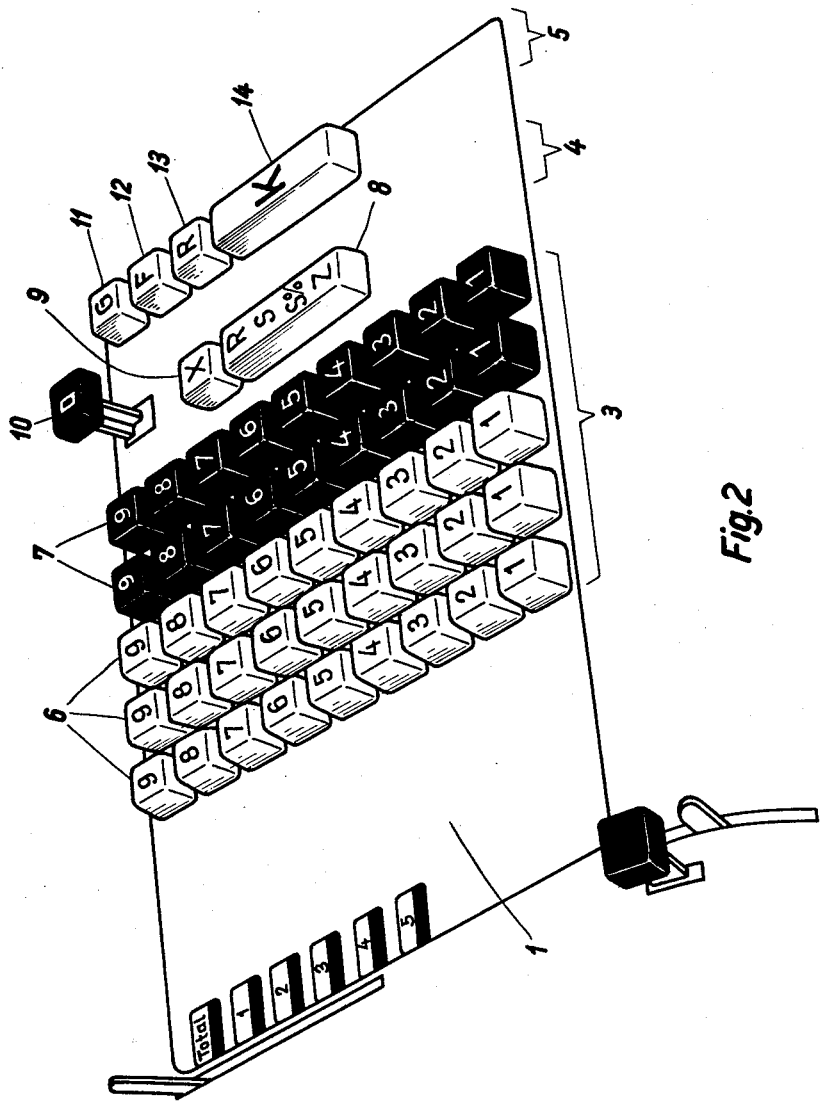
FIG. 2 is a perspective separate illustration of its keyboard field.

The keyboard field 1 of the cash register 2 according to FIGS. 1 and 2 comprises several amount-key banks 3, a bank 4 of keys for selecting the mode of operation, and a bank 5 of keys for selecting an adding mechanism. The amount-key banks 3 comprise three rows 6 of keys or amount-posting means for posting dollar amounts and two rows 7 of keys for posting cents amounts. The mode-control bank 4 comprises a special multi-purpose key 8, a key 9 for drawing subtotals, and a lockable key 10 for clearing the adding mechanisms. The adding-mechanism selector bank 5 comprises a number of keys for the separate registering of amounts relating to respectively different kinds of goods, namely a key 11 for the vegetables department, a key 12 for the meat department, a key 13 for smoke goods (or specialties), and a key 14 for groceries.

The control keys 8 to 14 in mode-control bank or machine-run control means 4 and adding-mechanism selector bank 5 are motorized; that is, each of these keys, aside from its primary function of selecting a mode of operation or an adding mechanism, also serves to release the motor-driven machine run.

Figure 3:
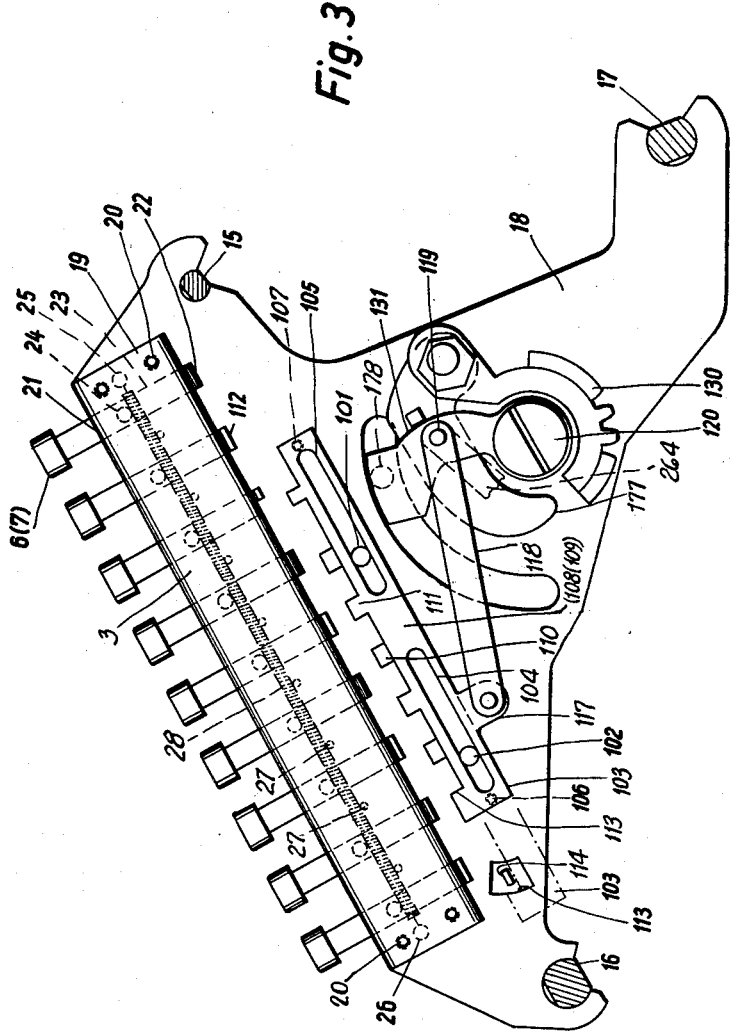
FIG. 3 is a lateral view of one of the amount-key banks of the machine.

The key banks 3 to 5 are designed as individual subassembly units of which one is separately illustrated in FIG. 3 and described presently. Shown in FIG. 3 is one of the amount-key banks 3. It comprises an approximately triangular mounting plate 18 fastened on transverse carrier rods 15, 16, 17 that form part of the rigid machine frame structure. Secured to the mounting plate 18 by means of screws 20 is a rail 19 of U-shaped profile with rectangular openings 21, 22 in which the shanks 23 of the respective amount keys 6 and 7 are displaceably guided. The key shanks 23 are provided with respective transverse pins 24 and are biased by a pull spring 28 normally holding the keys 6, 7 in the starting position shown in FIG. 3. The spring 28 is hung between pins 25 and 26, and is supported in proper position by stationary pins 27 in rail 19. The cross pins 24 of the key shanks are guided in slots 29 (FIG. 4) of the mounting plate 18. Displaceably mounted on pins 30, 31 of the mounting plate 18 are two blank sliders, namely a latching slider 32 (FIG. 5) and a control slider 33 (FIG. 6).

The latching slider 32 (FIG. 5), is biased by a spring 34 whose other end is attached to the mounting plate 18, is provided with latch noses 35 with inclined edges 36 against which a cross pin 24 will abut when one of the amount keys 6 or 7 is being depressed. As a result, the latching slider 32 is moved to the right (FIG. 5) in opposition to the pull of spring 34. In the lowermost position of the depressed key, one of the recesses 37 in the spring-biased latching slider 32 catches over the cross pin 24 of the depressed key and thus latches the key 6 or 7 in depressed position. Fastened to the latching slider 32 are pins 38, 39 which cooperate with a control pin 41 on a release control shaft 40 (FIGS. 5 to 11).

Riveted into the above-mentioned control slider 33 (FIG. 6), which is likewise biased by a pull spring (not illustrated), is a pin 42 which acts upon one of the control projections or lugs 43 (FIGS. 7 to 9) of a hollow control shaft 44 whose functioning will be explained in a later place. The control shaft 44 is coaxially rotatable on the releasing shaft 40 and extends above the amount-key banks 3 up to the height of the mode-control bank 4. The hollow control shaft 44 has recesses 45, 46 which, during assembling, serve for insertion of the releasing shaft 40 and which permit control movements of the releasing shaft 40 and its control pins 41 during operating condition. The control shaft 44 is further provided with a control member 48 which has a lateral lug with a journalling eye 47. The control member 48 acts upon a pin 51 of a control slider 52 (FIG. 10) in the assembly of the mode-control key bank 4. A pivot pin fastened in the eye 47 links a lever 50 to the control slider 52. The control slider 52 is displaceably mounted by means of elongated holes 53, 54 on respective pins 55, 56 of the mode-control bank 4 (FIG. 11) and is biased by a pull spring 57 accommodated in the mode-control bank 4. The slider 52 has narrow lateral recesses 59, 60 whose width corresponds to the diameter of the cross pins 58 on keys 9, 10 and an additional, wider recess 61 (FIG. 10) which permits movements of the control slider 52 even when the control key 8 is depressed, without such motion being prevented by the key pins 62. Fastened to the control slider 52 is a control pin 63 which acts upon a stop edge 64 of another control slider 65 (FIG. 12) likewise displaceably mounted in the mode-control bank 4.

The control slider 65 (FIG. 12) has a curved, elongated hole 66 engaged by the cross pin 67 of a blind key 68 displaceably mounted in the mode-control bank 4. Also attached to the control slider 65 is a slanting projection 69 which can cooperate with the cross pin 62 of the control key 8 depending upon the adjustment of the control slider 65. In the starting position shown in FIG. 12, the control slider 65 retains its position when the control key 8 is being actuated. A stop edge 70 (FIG. 12) of control slider 65 acts upon a control pin 71 of another control slider 72 (FIG. 13) which is likewise coordinated to the mode-control bank 4.

The control slider 72 (FIG. 13) has an inclined cam edge 73 and a projection 74 with another inclined edge, the two inclined contour portions cooperating with the respective cross pins 58 of keys 9 and 10. Also secured to the control slider 72 is a control pin 75 engaged by a fork 76 of an arm 77 which forms part of a bell-crank lever 79 fastened to a control shaft 78. Shaft 78 is journalled on the rigid machine frame structure.

The control shaft 78 (FIGS. 13, 14) carries a lever 80 near the adding-mechanism selector bank 5. The lever 80 has a fork portion 81 straddling a pin 83 fastened to the adding-mechanism selector slider 82. The selector slider 82 has extensions 84 with inclined flanks which cooperate with the cross pins 85 of the selector keys 11 to 14 in bank 5.

Linked to the arm 86 of the above-mentioned bellcrank lever 79 (FIGS. 13, 14) by means of a pivot pin 87 is a linking rod 88 which is connected through a double-armed lever 89, pivoted on the machine frame structure, with another connecting rod 90 pivotally joined by a pin 93 with a control lever 91 (FIG. 15) of a control shaft 92. Shaft 92 is revolvably mounted on the machine frame structure. The pin 93 is engaged by the jaws 94 and 95 of a pincer 97 which is rotatably mounted on a stationary pin 96 and is held in the closed position shown in FIG. 15 by means of a pull spring 98 and a fixed stop pin 99. Also fastened on the control shaft 92 is a selector cam disc 100 whose function will be described further below.

On the mounting plate 18 of each amount-key bank 3 (FIG. 3) there are fastened guide pins 101 and 102 on which a transfer slider 103 is displaceably seated by means of respective elongated holes 104, 105. The transfer slider 103 is composed of two slider portions 108 and 109 which are firmly joined with each other by spacer bolts 106, 107. The two slider parts 108 and 109 have rectangular tooth projections 110 and 111 displaced from each other along the slider structure in staggered relation for cooperation with the laterally bent key shanks 23 of the respective amount keys 6, 7. The bottom end of each shank thus constitutes a stop, such as the one denoted by 112. In the starting position of the transfer slider 103, shown in FIG. 3 by dot-and-dash lines, a latch member 114 of the zero-stop pawl 115 (FIGS. 3, 4) is located in front of the outermost left projecting tooth 113 of the transfer slider.

The zero stop pawl 115, whose design and operation are known as such (German Patent 963,111) is rotatably mounted on a pivot pin 116 of the mounting plate 118. The outer part 108 of the transfer slider 103 has a lug 117 with an eye to which a connecting rod 118 is linked. The other end of rod 118 is articulately joined with a pin 119 of the transfer (differential) mechanism illustrated in FIG. 16. The differential mechanism 120 is driven (FIG. 17) from the machine main shaft 121. Pairs of cam discs 124, 125 are mounted on the main shaft 121 for action upon follower rollers 126 and 127 of a driver segment 128 rotatably journalled on a shaft 129 that is fastened to the machine frame structure. The segment 128 has a gear portion in meshing engagement with the driving gear segment 130 of the differential mechanism 120 (FIGS. 17, 16, 3, 4).

*Differential mechanism operation*

The design and operation of the differential mechanism 120 will now be described in detail, mainly with reference to FIG. 16.

Figure 16:
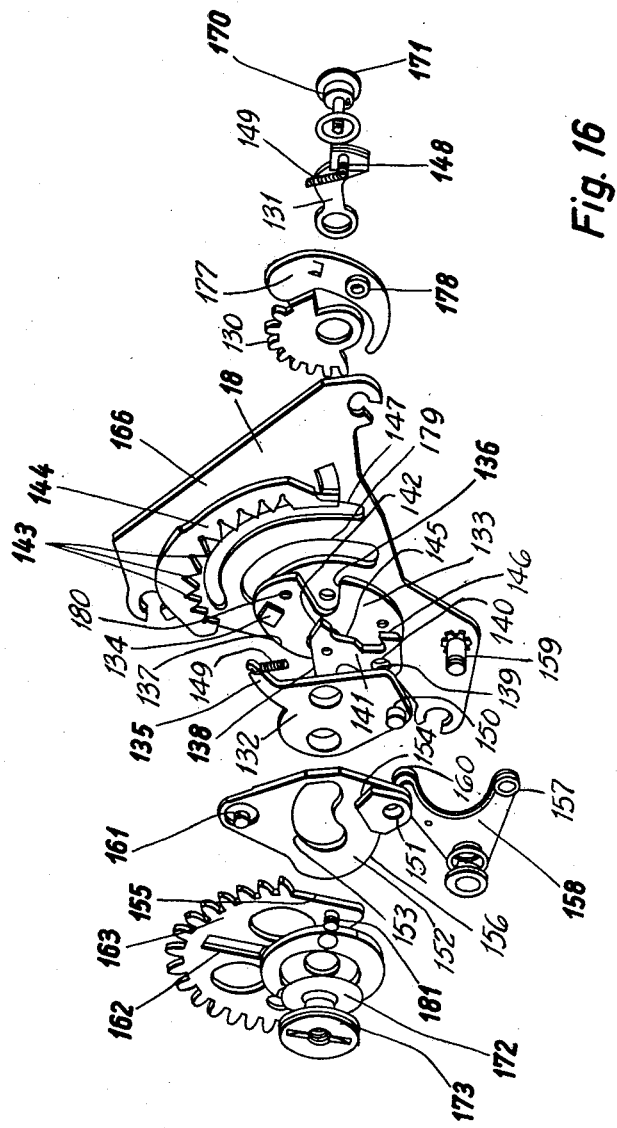
FIG. 16 shows one of the differential mechanisms of the cash register in perspective and exploded representation.
Figure 17:
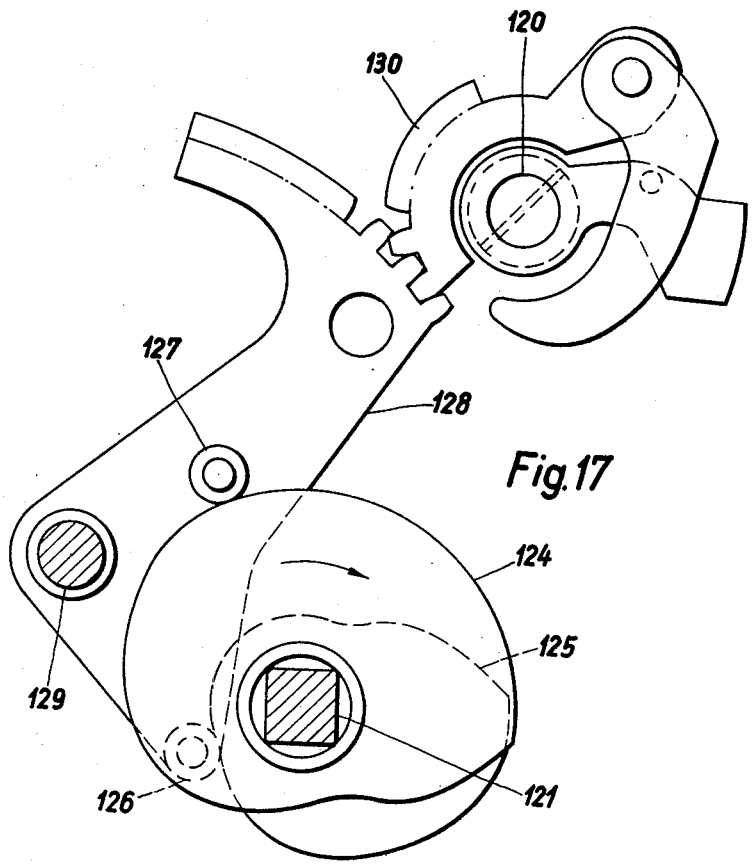
FIG. 17 is a lateral view of the mechanism for driving the differential mechanism.

The mechanism has a number of control, driving and driven members substantially mounted on a journalling bolt 171 fastened to a lateral wall 166 of the key-bank assembly by means of a nut 173 which has a guiding portion 172 (FIG. 16, extreme left). A stop arm 131 and the driving gear segment 130 are rotatably seated on a neck portion 170 of the bolt 171 (FIG. 16, extreme right). As described, the segment 130 meshes with a driving gear segment 128 (FIG. 17). In order to impart a given amount of angular motion to the stop arm 131 of the differential mechanism during each individual machine run the gear segment 130 is firmly joined with a finger-shaped arm 177. Fastened to the arm 177 is a dog pin 178 which passes through an arcuate opening 179 of side wall 166 into a bore 180 of a control cam 133. The cam 133 is rotatably mounted on the journal bolt 171 together with a coaxial control member 132 and a coaxial gear segment 163.

The control cam 133 carries a rectangular stop lug 134 which cooperates with a finger-shaped lug 135 of the control member 132. The cam contour of cam 133 has a V-shaped recess 136 and a cam curve 137 which radially ascends from the axis of the journal bolt 171. The V-shaped recess 136 of control cam 133 straddles a guide member 138 of a latch pawl 141. The pawl 141 has a tapering extension 142 which can enter into catch recesses 143 of an arresting segment 144 fastened to the side wall 166. The extension 142 merges with a cam curve 145 boardered and limited by a latch hook 146. The hook 146 cooperates with a pin 148 (FIG. 16, right) which is fastened to the stop arm 131 and extends through another arcuate opening 147 in side wall 166.

The control member 132, carrying the pawl 141, is biased by a pull string 149 (shown in two broken-apart parts) which is hung onto the lug 135 of control member 132 and connected with the pin 148 of the stop arm 131. The control member 132 further carries a bearing pin 150 which passes through a bore 151 of a cam segment 152. The cam segment 152 has an arcuate opening 153 and a stop 154 which acts upon the edge 155 of a gear segment 163. The segment 152 further has a cam curve 156 engaged by a roller 157. The roller 157 is journalled on a bifurcated latch lever 158 pivotally rototable about a pin 159 of the side wall 166. The latch lever 158 carries another roller 160 in follower engagement with the above-mentioned cam curve 137. Fastened to the cam segment 152 is a pin 161 engaging a radial, rectangular slot 162 of gear segment 163. Mounted on the finger-shaped arm 177 is a pin 178 which passes through the arcuate opening 179 of side wall 166 and engages the bore 180 of the cam disc 133, this disc being likewise coaxially rotatable on the journal bolt 171.

The side wall 166 in FIG. 16 corresponds, as to general shape and mounting, to the mounting plate 18 in FIG. 3.

The above-described differential mechanism commences its operation, after an amount has been posted in key bank 3 (FIGS. 1, 2), as soon as a machine run is initiated by depression of a control key in bank 4. During each such machine run the main control shaft 121 (FIGS. 4, 17) performs a single full revolution. During such revolution, the gear segment 130 (FIGS. 17, 16) of the differential mechanism is turned a given angle of rotation. Only when the machine run is completed, is the gear segment 130 reset to the starting position. In the meantime, the transfer mechanism has performed the operations described presently.

At the beginning of the machine run, the gear segment 130 acts through dog pin 178 upon the control cam 133 and turns it counterclockwise (FIG. 16). The control member 132 is entrained in the same sense of rotation, due to the fact that the pawl 141, secured to the control member 132, has its guide portion 138 engaged in the V-shaped recess 136 of control cam 133. Due to the action of the pull spring 149 the stop arm 131 participates in the same counterclockwise motion. As soon as the stop arm 131 is arrested in the selected position by the stop end 112 at the shank 23 (FIG. 3) of the depressed amount key, the control member 132, entrained by pawl 141, tensions the pull spring 149. Then the hook 146 of pawl 141 passes over the dog pin 128 and thereby turns the pawl 141 clockwise about its pivot 139, 140 relative to the control member 132. During further rotation of member 132, the cam curve 138 of pawl 141 is moved out of the V-shaped recess of control cam 133, and the extension or lug portion 142 of pawl 141 enters into one of the tooth recesses 143 of the arresting segment 144. This blocks the stop arm 131, as well as the parts 132, 141 connected therewith, in the position then reached, until the gear segment 130 has completed its counterclockwise driving motion.

The above-described gear segment 163 of the transfer mechanism meshes with gears (described below with reference to FIG. 18), which transmit its rotary motion to the printing devices and indicating devices of the cash register in order to set these devices in accordance with the amount posted into the machine. The gear segment 163 for transferring the posted data into the printing and indicating devices is driven by the pin 161 of the control cam 152, which pin passes through the radial slot 162 of segment 167.

For accurately adjusting the gear segment 163 which is biased clockwise by a spring (not illustrated), the gear segment 163 is blocked after it has reached the proper position. For this purpose, the control segment 152 has the above-mentioned stop 154 and cam contour 156. The cam curve 156 is engaged by the follower roller 160 of the latch lever 158 which blocks the gear segment 167 under the action of the cam curve 137 so as to reliably arrest the segment 163 in the position determined by that of the stop arm 131.

After the posted amounts are thus entered into the machine and any computing steps are completed, the gear segment 130 is returned to the starting position shortly before the termination of the machine run. During return travel, the blocking of the gear segment 163 by the latch lever 158 is released and, during further return motion of the control cam 13, the spring 149 pulls the guide member 138 of the pawl into the V-shaped recess 136 of the control cam 133. This releases the stop arm 131 so that the arm can return to its starting position under the action of the gear segment 130.

*Indicating and printing devices*

As mentioned above, the gear segment 163 of the differential mechanism controls the indicating and printing or registering devices of the machine. This will now be described in detail.

Fastened to the gear segment 163 (FIGS. 16, 4) is a crank pin 181. Linked thereto is a laterally bent connecting rod 182 which is pivotally joined with an arm 183 of a gear segment 184 (FIG. 4) and is rotatably mounted on a fixed pivot pin 185 by means of a tubular shaft 186. The gear segment 184 meshes with a pinion 187 of an indicator disc 188 journalled on a fixed shaft 189. The disc 188 forms a component of an indicating device 190. Another gear segment 191 is fastened on the tubular shaft 186 but is axially displaced from the disc 188 and in meshing engagement with the pinion 192 of an indicator disc 194 arranged on a pivot shaft 193.

The tubular shaft 186 is coaxially assembled with further tubular shafts, each extending from one of the respective differential-mechanisms to a corresponding one of the indicator discs. Such telescope assemblies of tubular shafts are known from U.S. Patent 2,579,535 and are also shown in my above-mentioned application Serial No. 24,485.

The gear segment 163 is accurately adjusted with the aid of a calibrating detent lever 195 whose tapering tooth 196 enters into a gap of the segment 163 thereby accurately determining each individual position of the segment 163. The detent lever 195 is rotatably mounted on a pivot 197 and driven by control cams 198, 199 fastened on the machine main shaft 121 and acting upon follower rollers 200, 201 of a three-armed lever 203 rotatable on a fixed pivot 202. The arm 204 of lever 203 is joined by a link 205 with a bellcrank arm of the detent lever 195.

Figure 18:
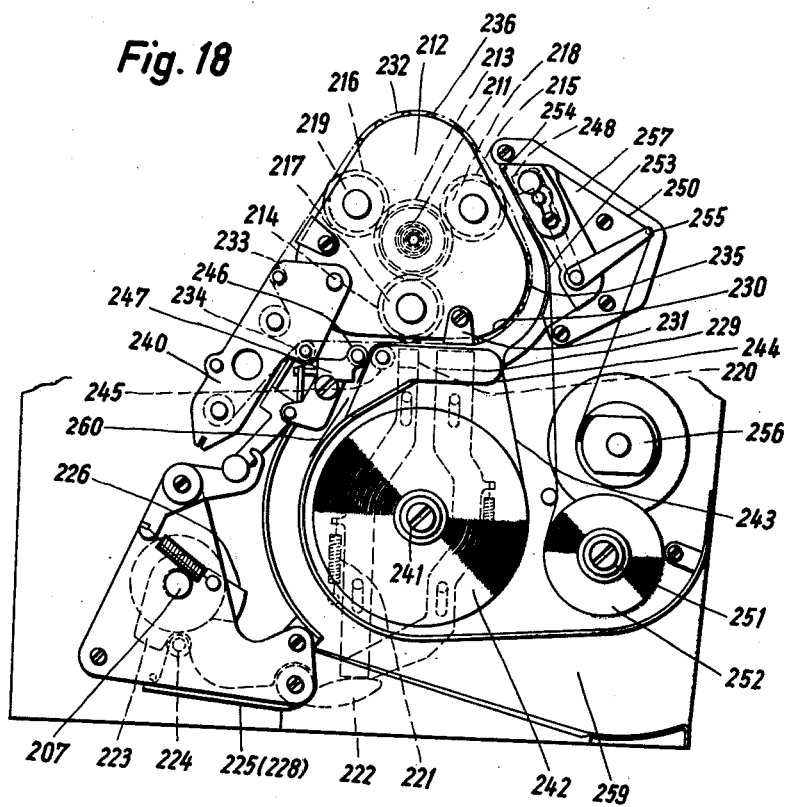
FIG. 18 is a lateral view of the printing mechanism.

The gear segment 163 of the differential mechanism 120 meshes with a gear 210 fastened on a tubular shaft 211 that extends up to the height of the printing mechanism 212 separately shown in FIG. 18. Shaft 211 also forms part of a coaxial shaft assembly similar to that of tubular shaft 186.

In the printing mechanism 212 of the machine, the tubular shaft 211 carries a spur gear 213 meshing with three gears 214 to 216 of respective printing-type wheels 217 to 219 respectively. The type wheel 217 cooperates with a printing hammer 220 which is subject to the force of a spring 221 and is driven by the arm 222 of a double-armed lever 225 controlled by a cam 223 through a follower roller 224. The details of the printing-hammer controls are known as such, for example from U.S. Patent 2,784,666, so that it suffices to describe in the following only those features that contribute to understanding the present invention. Another cam 226 is arranged on an axially displaceable drive shaft 207 beside the cam 223 and acts upon a follower 228 which actuates a spring-biased cliché-printing hammer 229 cooperating with a cliché 231 fastened in a printer mechanism frame 230.

An inking tape 232 extends between the type wheels 217, 218, 219 and the cliché 231 on the one hand, and the corresponding type-printing hammers 220 and the cliché printing hammer 229 on the other hand. The inking tape 232 is guided by rollers 233, 234 and also by guide sheets 235, 236 fastened to the mechanism frame 230, thus extending to a tape-feed stepping mechanism 240 of conventional design and operation.

Journalled on a shaft 241 is a roll of paper tape 242 from which the tape 243 passes over a fixed guiding sheet 244 and between a transport roller 245 and a counter roller 246 beneath the type wheels and the cliché. Thence the tape passes through a severing and perforating device 247 of conventional design and operation.

The type wheel 218 cooperates with a printing hammer 248 for producing imprints on a recording tape 250 (FIGS. 18 and 1) which is supplied from a roll 252 journalled on a stationary shaft 251 and passes through a guide sheet 253 and guide rollers 254, 255 to a take-up spool 256. The drive and control of the recording tape printer 257 are also known as such and therefore not further described herein.

If desired, the type-printing wheels 219 may also be employed for imprinting a voucher that can be inserted into the machine by hand with the aid of a conventional guiding pocket as shown at 258 in FIG. 1.

Located beneath the severing and perforating device 247 is an ejector opening 259 for the imprinted and severed vouchers 260, 261. The opening 259 widens toward the outside (FIGS. 1, 18). Examples of checks or vouchers thus issued by the machine are illustrated in FIGS. 19 and 20.

*Connection of differential with computer mechanism*

The connection of the above-described differential mechanisms with the computer mechanisms of the machine will be explained presently.

Figure 21:
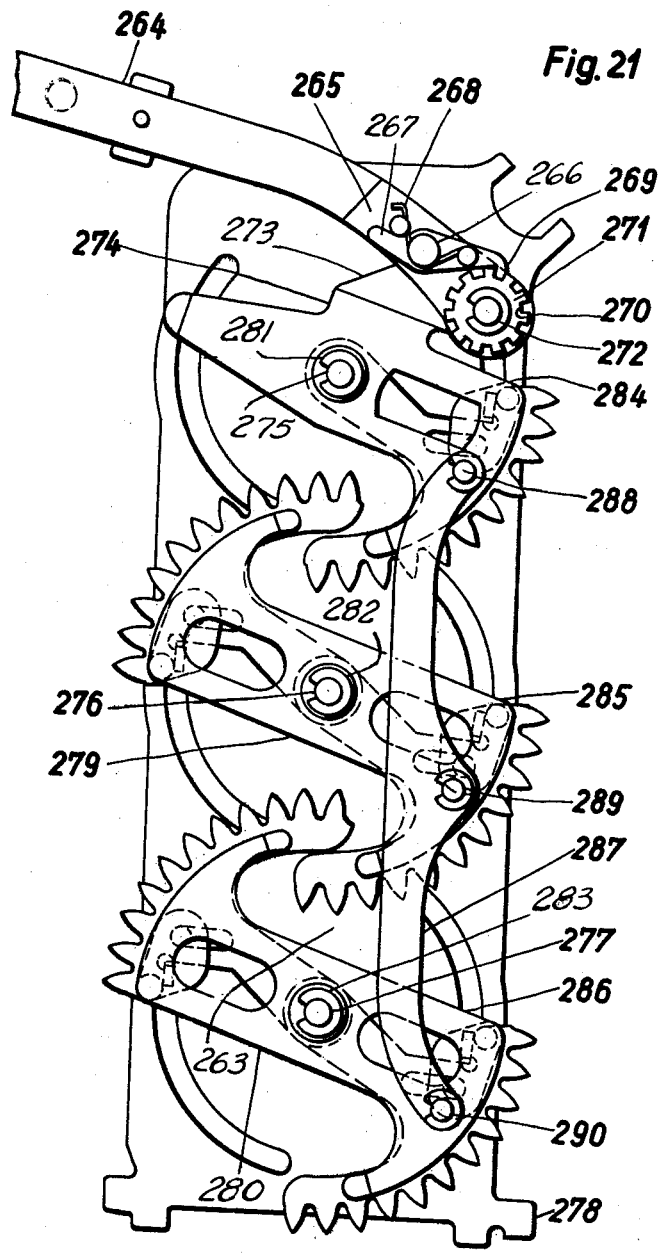
FIG. 21 shows the control segments of the computing mechanism by a lateral view.
Figure 22:
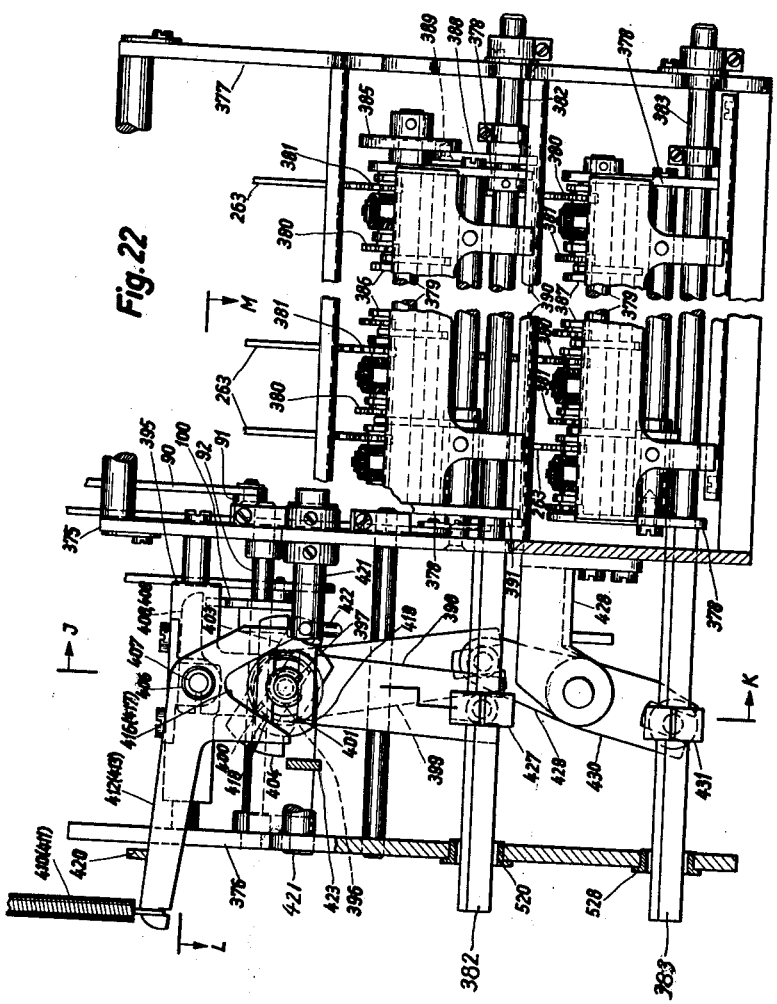
FIG. 22 is a front view of the computing mechanisms and of an appertaining displacing device.
Figure 23:
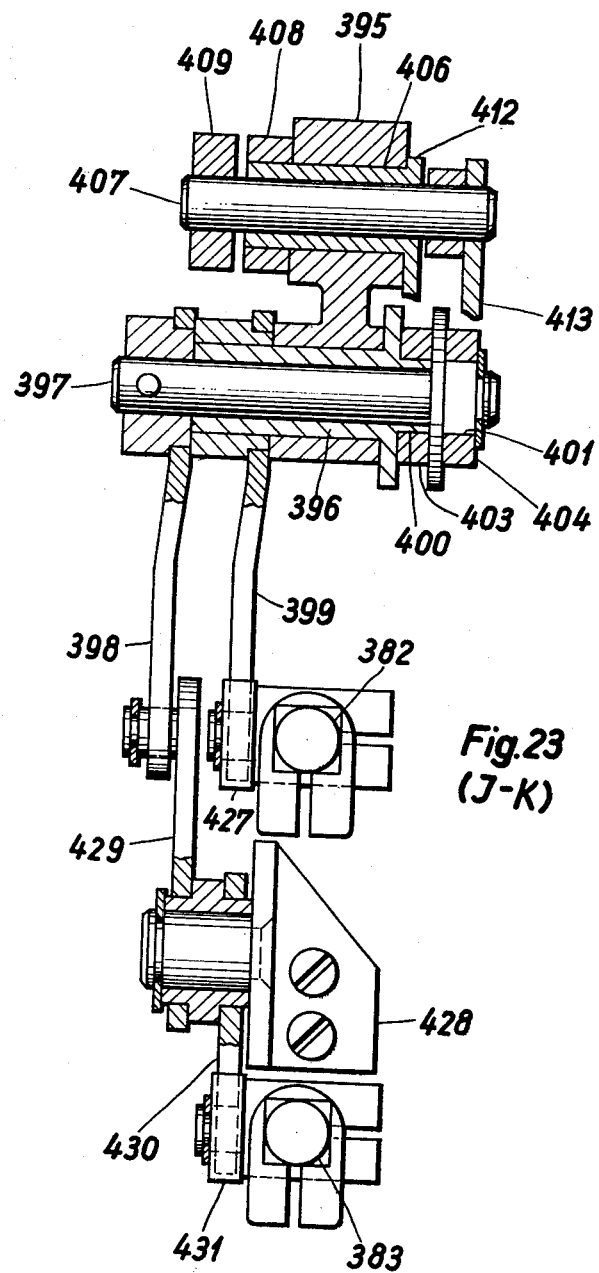
FIG. 23 is a section along the line J–K in FIG. 22.

The data input members of each computer assembly are constituted by gear segments (control segments) 263 shown in FIGS. 21 and 22.

Figure 4:
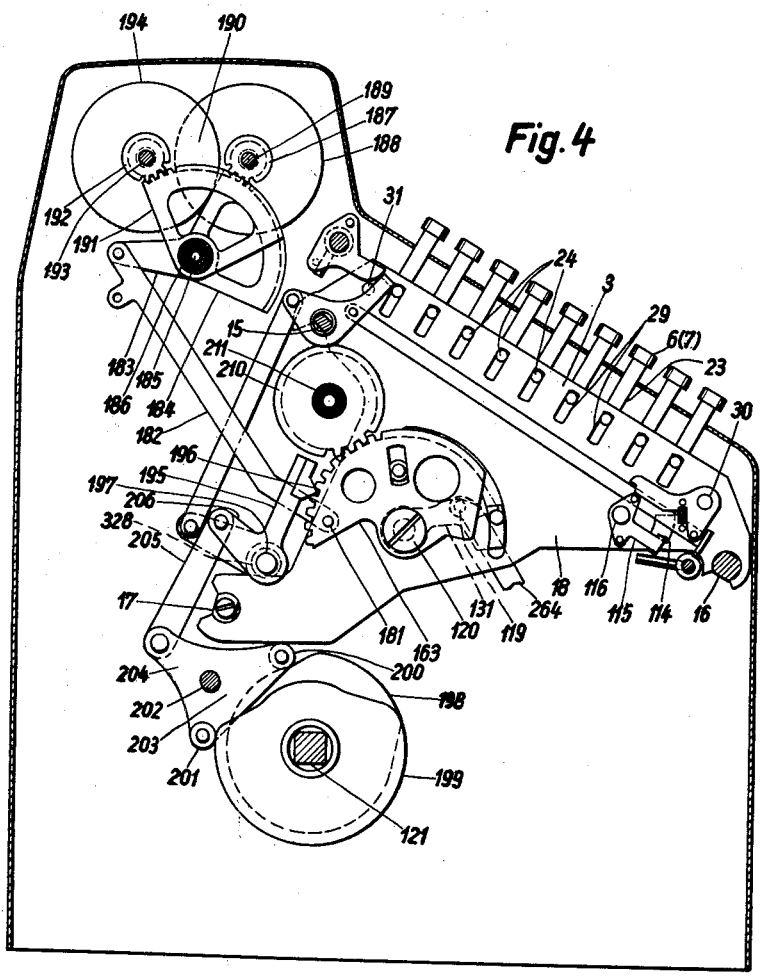
FIG. 4 is a cross-sectional view of the machine taken along one of the amount-key banks.

A pull rod 264, shown in FIGS. 3 and 4 by dot-and-dash lines, is pivotally fastened to the pin 119 of the stop arm 131 in the differential mechanism 120 and has a laterally bent portion 265 (FIG. 21) which carries a cross pin 266. A detent 267 is pivoted on pin 266 and biased by a torsional spring 268 so that a nose 269 of the detent enters between teeth 270 of an adjusting disc 271 eccentrically arranged on the portion 265 of rod 264. The adjusting disc 271 engages a pin 272 fastened to a lever arm 273 of a driving segment 274. The segment 274 is rotatable on a pivot pin 275. Two further driving segments 279 and 280 are rotatable on respective pivot pins 276 and 277. The three driving segments 274, 279, 280 are prevented from axial displacement on the respective pivot pins by means of spring washers 281, 282 and 283. The driving segment 274 is connected with a simple gear segment 284. The other driving segments 279 and 280 are each provided with double gear segments 285 and 286 respectively. The driving segments 274, 279 and 280 are articulately joined with one another by means of a connecting rod 287 so that all gear segments 284, 285 and 286 are turned in the same direction about the pivot pins 275, 276 and 277 respectively by motion supplied from the differential mechanism 120 and transmitted through the pull rod 264.

Figure 11:
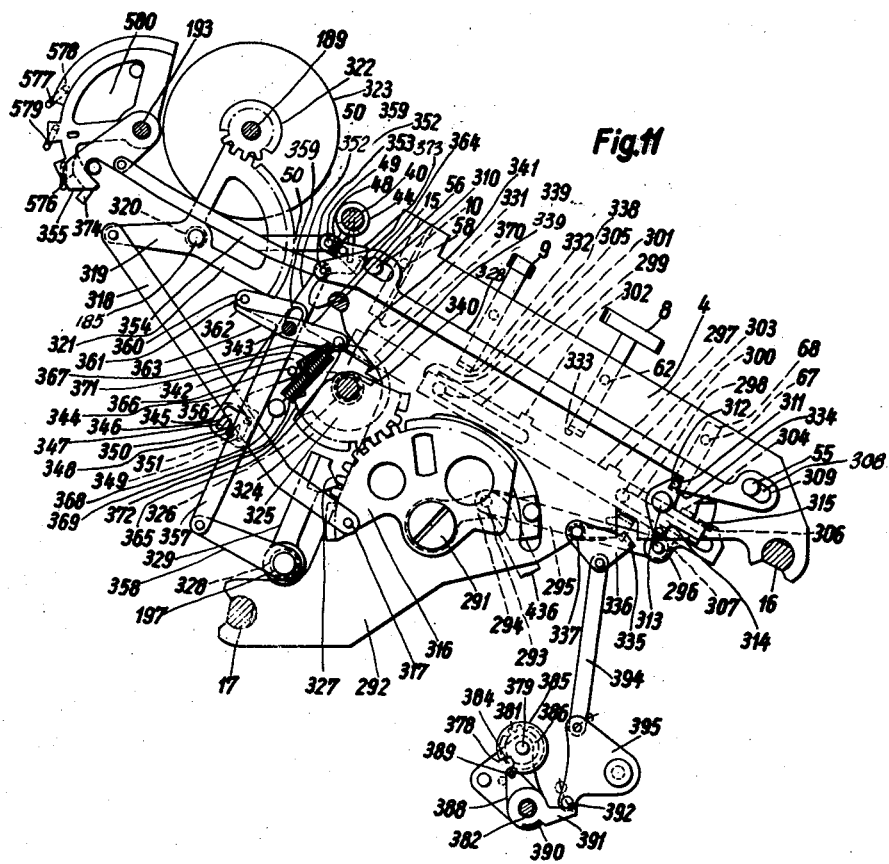
FIG. 11 shows part of a cross-sectional view through the cash register taken along the mode-control bank.
Figure 11A:
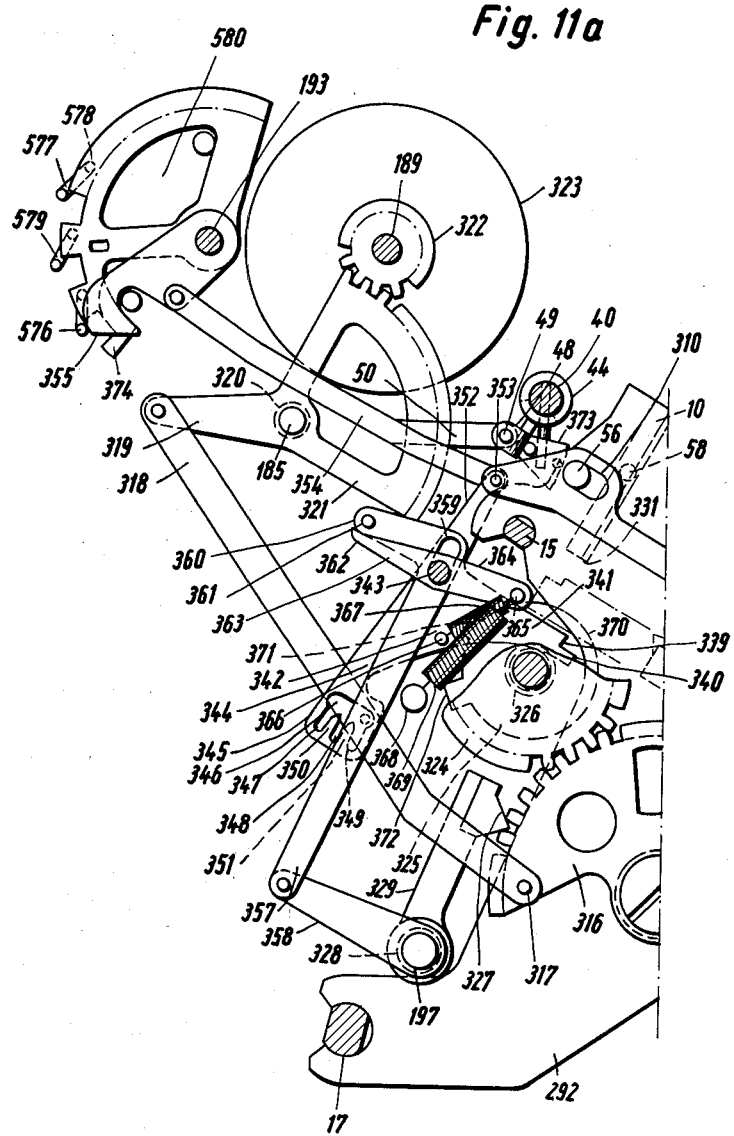
FIGS. 11a and 11b are each portions of FIG. 11 shown in enlarged view.
Figure 11B:
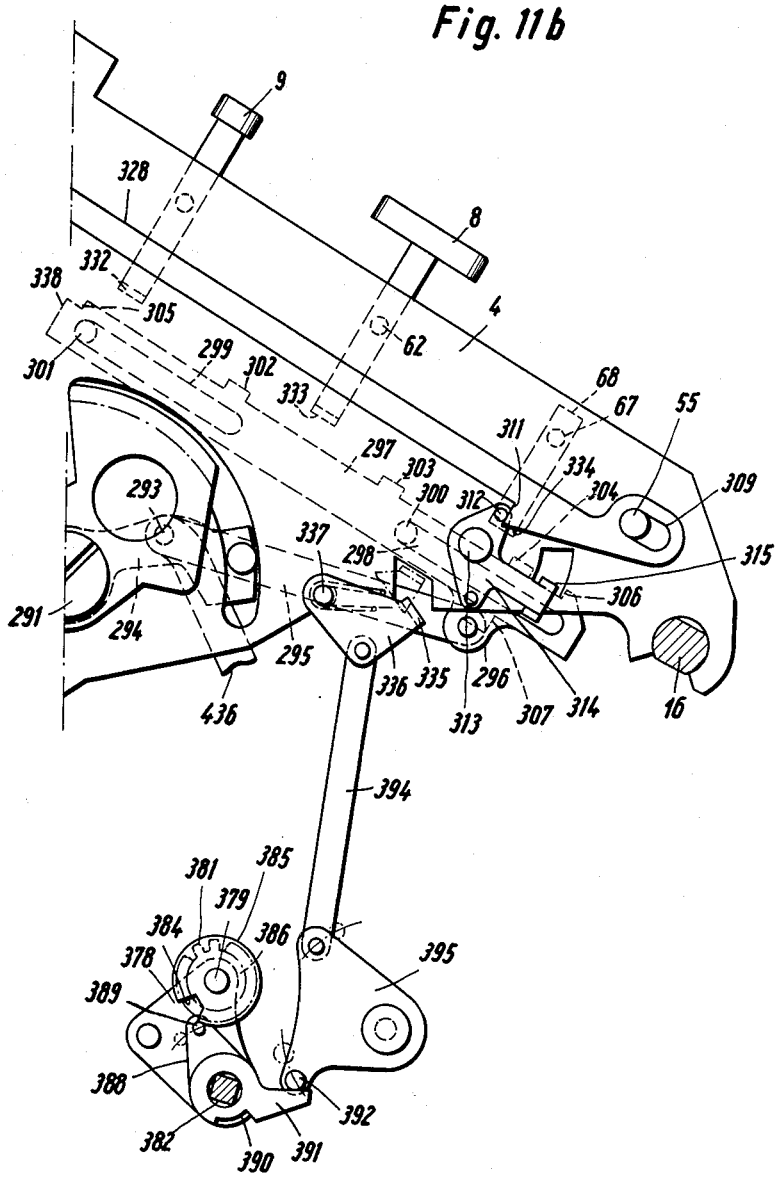

The differential mechanism generally denoted by 291 in FIG. 11 is disposed on the mounting plate 292 in mode-control bank 4. Its design is exactly the same design as that of the differential mechanism 120 for each of the amount-key banks 3 illustrated in FIG. 16 and described above. A feeler or stop arm 294 (FIG. 11) of the differential mechanism carries a pivot pin 293 for a linking rod 295. The other end of rod 295 is pivotally joined with an eye lug 296 of a slider 297. The slider 297 has elongated holes 298, 299 by means of which it is displaceably guided on guide pins 300, 301 fastened to the mounting plate 292 of bank 4. The top edge of the slider has upwardly projecting and laterally bent lugs 302, 303, 304 of rectangular shape and two recesses 305, 306, at opposite ends of the slider 297. A projection 307 at the lower side of the slider 297 serves as a stop.

The fixed guide pins 55 and 56 guide not only the above-mentioned control sliders 52, 65, 72 (FIGS. 10, 12, 13) and a zero pawl slider (not illustrated) controlled by the control keys 8, 9 and 10, but serve also as guides for an additional zero pawl slider 308 which has elongated holes 309, 310 traversed by the respective pins 55, 56. An entrainer shoulder 311 of slider 308 acts upon the pin 312 of the zero stop pawl 314 for the mode-control bank 4. The pawl 314 is pivoted on a pin 313, so that when the zero pawl slider 308 is being displaced to the left (FIG. 11), the stop 315 of the zero pawl 314 is lifted and thus moved out of the path of the bank slider 297. This releases the differential mechanism 291 which then can start operating.

The gear segment 316 of the differential mechanism 291 carries a pin 317 (corresponding to the above-mentioned pin 181 on gear segment 163 of the differential mechanism 120 in FIG. 4) which is pivotally joined with a pull rod rod 318 (FIG. 11). The rod 318 is connected with an arm 319 of a gear segment 321 which is fastened on a tubular shaft 320 and meshes with a pinion 322 of an indicator disc 323. The gear segment 316 meshes with a spur gear 324 riveted together with a control cam disc 325. The spur gear 324 is fastened, such as by shrinking, onto a tubular shaft 326 which, as described above for the analogous tubular shaft of the differential mechanism 120, is connected with the printing mechanism 212 for adjusting the symbol-printing type wheels assigned to the mode-control bank 4.

The gear segment 316 is also acted upon by the stop 327 of a calibrating lever 329 which is connected with the calibrating lever 195 (FIG. 4) by a sleeve 328 coaxially journalled on the shaft 197.

The above-mentioned stepped recess 305 of the slider 297 in the differential mechanism cooperates with the stop shoulder 331 of the lockable key 10, whereas the lugs 302, 303, 304 cooperate with the angular stop lugs 322, 333, 334 of the control keys 8, 9 and the blind key 68 respectively. A control member 336 is pivotally mounted on the mounting plate 292 by means of a pivot pin 337 (FIG. 11) and has a lateral lug 335 which, when the control member 336 is turned upwardly, protrudes into the path of a stop projection extending downwardly from the bank slider 297, the active, upward position of the lug 335 being shown by dot-and-dash lines. The forward, left edge 338 of the bank slider 297 cooperates with a stepped stop abutment 339 an with another stop formed by an extension 340 of an arm 341 which is part of a three-armed release control lever 342. The control lever 342 is rotatably mounted on a stationary pivot pin 343 and has another one 344 of its three arms provided in its lower portion 345 with a contoured hole 346 downwardly merging with fork-shaped slots 347, 348, 349 with intermediate sharply pointed teeth 350, 351. The third arm 352, located in the top portion of release control lever 342, has a pivot pin connected by a linking rod 354 with a releasing pawl member 355 which is rotatably fastened on the above-mentioned shaft 193.

The contoured hole 346 of the release control lever 342 (FIG. 11) is engaged by the pin 356 of an angular lever 357 articulately linked with a swing member 358 fastened on a sleeve 328 and guided on the pivot pin 343 by means of an elongated hole 359 in swing member 358. A pin 361 is riveted to the arm 360 of the angular lever 357 and cooperates with the arm 362 of the double-armed lever 363 rotatably mounted on the pivot pin 343. Another pin 365 is fixed to arm 364 of lever 363 for attachment of two pull springs 367 and 369. The other end of pull spring 367 is hung onto a pin 366 of the release control lever 342. The other end of spring 367 is anchored on a stationary pin 368. The pin 365 of lever 363 normally engages the circular cam contour 370 of the above-mentioned control cam 325, this contour being interrupted by rectangular stop projections 371 and 372 of respectively different heights.

Only partly shown in FIG. 11 is the stop slider 373 which is guided for displacing motion on the pins 55 and 56 of the mode-control key bank 4, this slider being designed similar to the stop slider 32 according to FIG. 5. Also shown in FIG. 11 is the latch pawl 374 pivoted on shaft 193 and connected with the above-described control shaft 44 by means of the lever 50.

*The computing mechanism*

The design and operation of the computing mechanisms which form part of the illustrated cash register and perform adding and subtracting operations on the basis of numerical values posted by means of the key banks 3, subject to selection and control by the key banks 4 and 5, will now be described mainly with reference to FIGS. 21 to 25.

The illustrated computer assembly (FIG. 22) comprises a component subtracting mechanism 386 and a component adding mechanism 387 (hereinafter jointly called add-sub mechanism). The two component portions of the add-sub mechanism are fastened on respective control shafts 382 and 383 of which each has a portion of square cross section and is mounted between lateral walls 375, 376, 377 of the machine frame structure so as to be capable of revolution and longitudinal displacement. Each control shaft 382 and 383 carries a number of parallel, radially extending arms 378 (FIG. 22, FIG. 11, bottom portion). Fastened between the arms 378 are shafts 379 which extend parallel to the control shafts 382, 383 and carry positive counting gears 380 and negative counting gears 381 of a minus (subtracting) mechanism 386, and positive and negative counting gears 380, 381 respectively of a plus (adding) mechanism 387. The positive counting gears and the negative counting gears of each of the two component mechanisms are connected with each other by a differential transmission.

Fastened to the negative counting gear 381 in the highest digit position of the minus mechanism 386 is a cam disc 385 (FIG. 22) which has a cam groove 384 (FIG. 11) for operating with a follower pin 389 attached to an arm 388. The arm 388 forms part of a switching bridge 390 rotatably mounted on the control shaft 382. The switching bridge 390 has a switching lever 391 acting upon the pin 392 of a lever member 395 (FIG. 11) which is linked to the above-mentioned control member 336 by a connecting rod 394.

It will be understood from the foregoing that each computer assembly of the illustrated cash register, in accordance with the fundamental design of computing devices of this type, has each digit position provided with a spur gear (positive counting gear) 380 assigned to positive values, and another spur gear (negative counting gear) 381 assigned to negative values, the negative gear 381 being differentially connected with the positive gear 380. Consequently, the entering of numerical values into the computing assembly by means of spur-gear segments 263 (FIGS. 22, 21) for the purpose of performing additions and subtractions, can occur only in the positive sense of rotation. However, for subtracting operation, the particular minus or plus mechanism 386 or 387 (FIG. 22) must be axially displaced so that the negative counting gears 381, instead of the positive gears 380, enter into meshing engagement with the respective gear segments 263.

The device for thus displacing the computing mechanisms 386, 387 is designed as follows.

Figure 24:
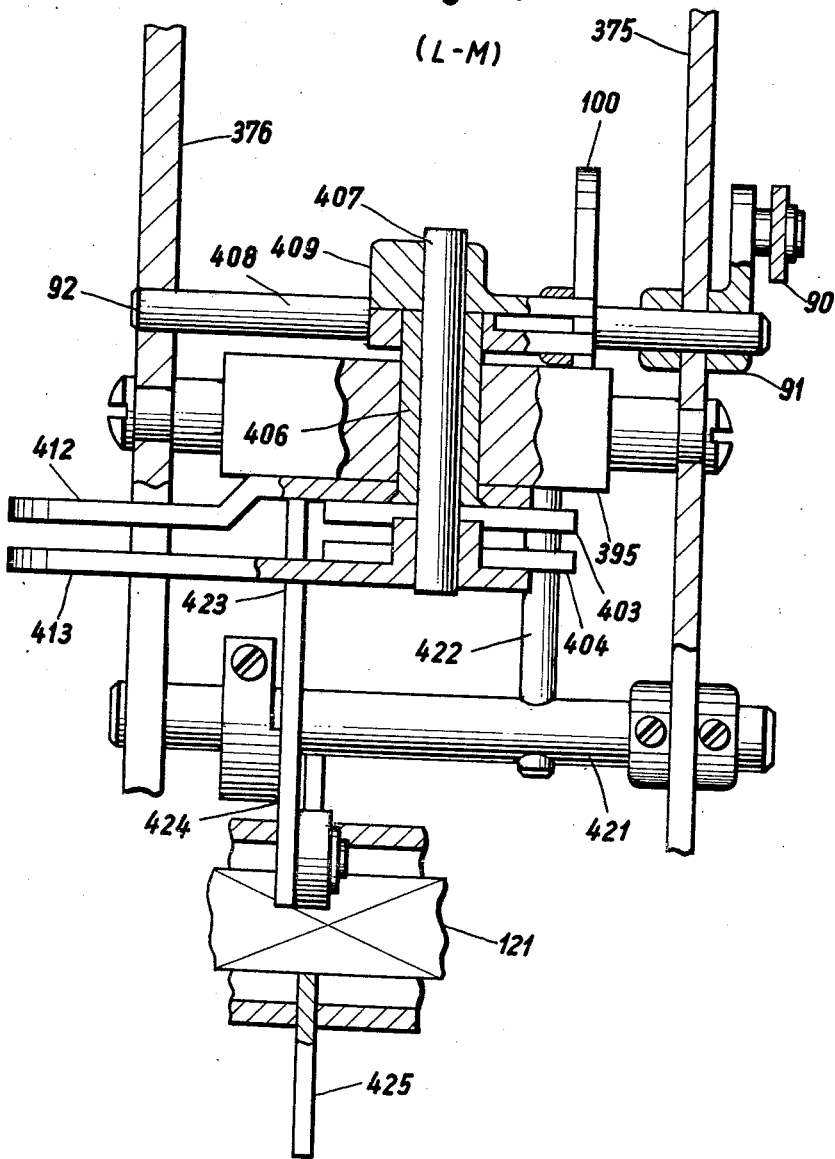
FIG. 24 is a section along the line L–M in FIG. 22.

A stationary bearing block 395 (FIGS. 22, 23, 24) is fastened by screws between the side walls 375 and 376 of the frame structure. Block 395 has two journal bores. One bore carries a pivot shaft 397 surrounded by a sleeve 396. Those ends of the sleeve 396 and of the shaft 397 that face away from the observer of FIG. 22, are riveted together with respective levers 398 and 399 (FIG. 23); and the other ends, facing the observer in FIG. 22, are provided with respective bearing members 400 and 401 (FIG. 23) for journalling respective control bridges 403 and 404. The second journal bore of bearing block 395 rotatably accommodates a pivot shaft 407 surrounded by a sleeve 406. Sleeve 406 and shaft 407 are connected with respective levers 408 and 409. The forward ends of sleeve 406 and shaft 407 are riveted together with respective switching levers 412 and 413 (FIG. 24) each biased clockwise relative to FIG. 22 by a spring 410 or 411. The switching levers 412, 413 have respective bifurcated portions 416, 417 (FIG. 22) straddling and engaging respective projections 418, 419 of bridges 403 and 404. The levers 408 and 409 with which the respective switching levers 412 and 413 are connected, engage as cam followers the stepped selector cam disc 100 to be controlled thereby for plus-minus selection (FIGS. 24, 15).

A latch lever 420 (FIG. 22) controlled by a cam (not illustrated) of the machine drive shaft 121 (FIG. 24) releases the switching levers 412, 413 at the beginning of the machine run so that the springs 410, 411 can turn the levers 412, 413 clockwise about their respective pivot structures 406, 407. As a result, the bridge structure 403, gliding on the bearing member 400 and controlled by the cam follower 408, and the bridge structure 404 controlled by the cam follower 409, are displaced to the left or right relative to FIG. 22 until the feeler levers 408, 409 abut against the contour of the plus-minus selector cam 100 (FIGS. 15, 24) displaced by the above-described actuation of the control keys in bank 4.

The bridge structure 403 cooperates with a lateral dog pin 422 of a control shaft 421. The bridge 404, located behind the bridge 403 (FIG. 22), cooperates with a control lever 423 of a cam follower 424 (FIG. 24) which is fastened to the control shaft 421 and is driven from a control cam 425 fastened on the machine main shaft 121.

Figure 25:
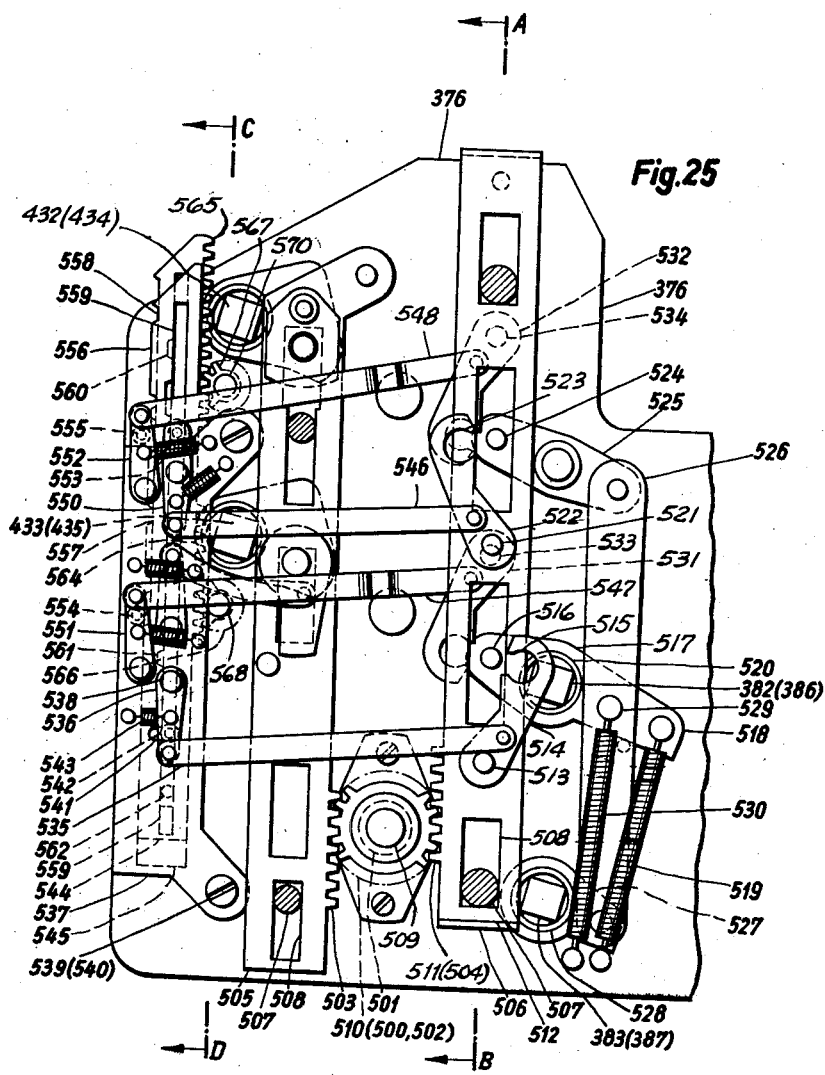
FIG. 25 shows the selector and mode-of-operation control device for the computing mechanisms in lateral view.

The lever 398, fixed on sleeve 396 and journalled on pin 397, is connected with the control shaft 382 by a bearing block 427 secured to the square portion of control shaft 382 (FIGS. 22, 25). The lever 399 (FIG. 22) riveted together with pin 397, is linked by constrained sliding engagement with an intermediate lever 429–430 rotatably mounted on a bearing block 328 which is secured by screws to the intermediate wall 375. The intermediate lever 429–430 has a bifurcated portion straddling a pin of a bearing block 431 which is fastened on a square portion of control shaft 383 to transmit axial sliding motion thereto.

When, for example, dog pin 422 of control shaft 421 (FIGS. 22, 24) is turned beneath the slide block 403 under control by the machine main shaft 121, as explained above, then the dog pin 422 engages the bridge structure 403 (which FIG. 22 shows in rotated position) and moves the bridge structure counterclockwise about its pivot pin 397. Simultaneously, the bearing block 400 and the above-mentioned sleeve 396 are effective to also turn the control lever 398 counterclockwise so that the control shaft 382 and thus the minus mechanism 386 are shifted toward the right (relative to FIG. 22) into positive position.

As mentioned, the machine shown by way of example, is provided with a totalizing computing device (minus mechanism 386, plus mechanism 387) in order to compute, indicate and print the amount of "change" as the difference between receivable and tendered amounts.

If the positive sides (counting gears) 380 of the add-sub mechanisms 387, 386 are taken in view (FIG. 22) then in the zero condition:

The minus mechanism 386 is in position 9999.99
And the plus mechanism 387 is in position 0000.00 i.e., the minus mechanism 386 has advanced one numerical unit (the so-called "fugitive unit"). This obviates otherwise necessary switching means. Since both mechanisms are charged on the positive side (gears 380) for addition, and are both charged on the negative side (gears 381) for subtraction, genuine positive sums are always located on the positive side (380) of the plus mechanism 387, and genuine negative amounts are always located on the negative side (381) of the minus mechanism 386.

Aside from the plus-minus mechanism 386, 387 described above, further summing and adding mechanisms 434, 435 (not illustrated) are arranged on the squared portions of respective shafts 432, 433 according to FIG. 25, these further mechanisms cooperating likewise with computer control segments 263. The design of such mechanisms is known as such so that it suffices in the following to refer to them only to the extent necessary for understanding the present invention proper; if desired, however, reference may be had to my above-mentioned copending application Serial No. 86,878.

*Mode of operation control means*

The means for controlling the mode of operation (addition, subtotal, grand total) and for correspondingly swinging the plus-minus mechanisms 386, 387 into and out of operative positions, as well as correspondingly actuating the totalizer or balance-drawing mechanisms 434 and the adding mechanisms 435, are designed as follows.

Figure 26:
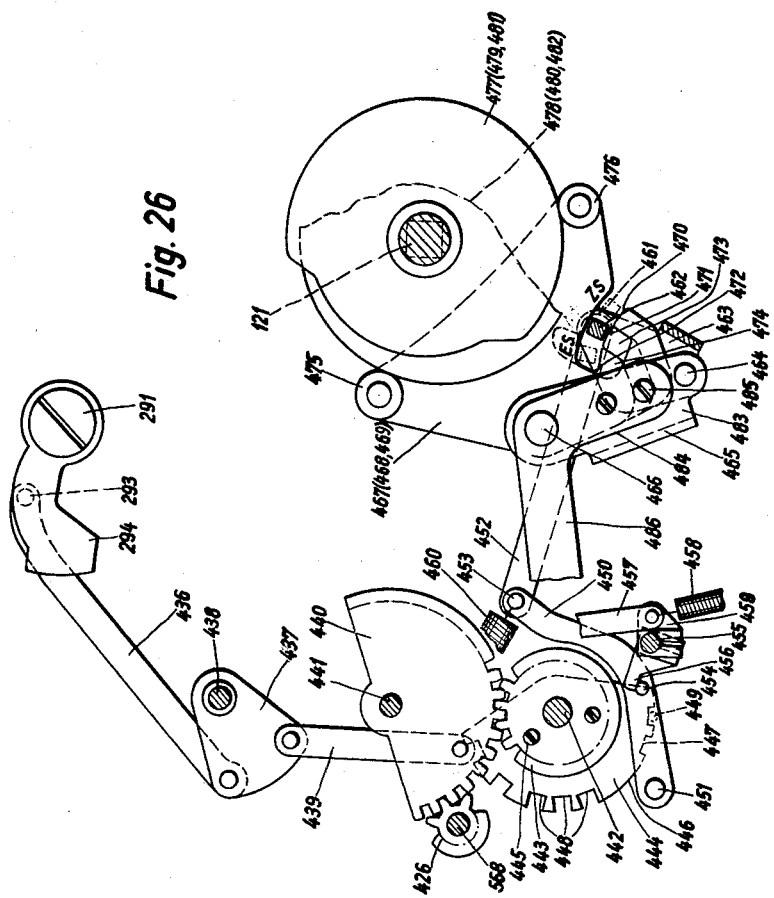
FIG. 26 is a lateral view of the mode-control device.

The feeler or stop arm 294 in the differential mechanism 291 of the mode-control bank 4 has its crank pin 293 linked to a pull rod 436 (FIGS. 11, 26) which is pivotally connected with a guide member 437 (FIG. 26). Member 437 is pivoted on a stationary pin 438 and is joined by a link 439 with a gear segment 440 rotatable on a stationary pin 441 (the segment is 440). The gear segment 440 meshes with a spur gear 443 which is fastened on a control shaft 442 and coaxially joined by screw bolts 445 with a control segment 444. The contour 446 of segment 444 is interrupted by rectangular recesses of respectively different dimensions relative to the radial spacing of their respective bottoms from the control shaft 442.

The outer contour 446 and the recesses 447, 448 of the control segment 444 cooperate with the feeler pin 449 of a feeler lever 450 pivoted on a stationary pin 451 and articulately joined by a pin with a control rod 452. The feeler lever 450 is further provided with a pin 454 acted upon by a control lever 456 which, when rotating counterclockwise with respect to FIG. 26, causes the feeler pin 449 to be lifted off the contour 446 of the control segment 444. Such counterclockwise rotation of the control lever 456 is effected by means of a cam (not illustrated) fastened on the machine main shaft 121 which acts through a linking rod 457 upon an arm 459 biased by a pull spring 458. When arm 459 is moved counter-clockwise by linking rod 457 in opposition to the force of spring 458, it turns the shaft 455 of control lever 456 in the same direction.

A pull spring 460, anchored to a stationary abutment, is attached to the pin 453 of the control rod 452 to whose right-hand portion 461 a coupling shaft 462 of square cross section is rotatably fastened. The coupling shaft 462 is journalled on a bracket 463 rotatably mounted on the pivot pin 464 of a control bridge 465. The bridge 465 is fastened to a shaft 466 rotatable on the stationary machine-frame structure. Three swing levers 467, 468, 469 are loosely pivoted on shaft 466. Each of these swing levers has a lateral recess so shaped as to form a stop 470, 471 or 472. The three stops 470, 471, 472 of the respective swing levers are located beside each other (FIG. 26) and cooperate with the coupling shaft 462. The stops 470 and 471 are interrupted by recesses 473 and 474 respectively so that only one of respective stops 470, 471, 472 can coact with the coupling shaft 462 at a time, while the other two swing levers are then not prevented from performing their respectively different swinging motions. The swing lever 467 carries two rollers 475 and 476 in follower engagement with a pair of respective cam discs 477 and 478 on the machine main shaft 121 for driving the swing lever 467 to perform subtotalizing operations. Analogously, the swing lever 468 is provided with a pair of follower rollers which engage a cam pair 479, 480 for addition operations; and the swing lever 469 has follower rollers in engagement with a pair of cams 481, 482 for grandtotal (balance-drawing) operations of the machine.

Figure 27:
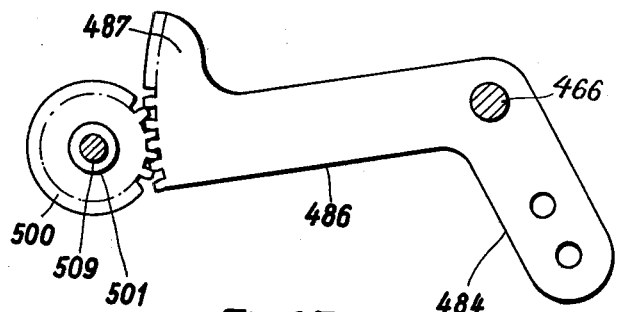
FIG. 27 illustrates a detail of the mode-control means.

The forward portion 463 of the control bridge 465 carries an angular lever 484 which is fastened to the bridge by means of a screw bolt 485 and has an arm 486 carrying a gear segment 487 (FIG. 27) meshing with a spur gear 500. Spur gear 500 is fastened on a tubular mode-control shaft 501 (FIGS. 27, 28, 25) which is journalled in the side wall 376 of the frame structure and carries a pinion 502 (FIG. 28). The pinion 502 meshes with racks 503, 504 (FIG. 25) of respective mode-of-operation control sliders 505, 506 displaceably mounted on the side wall 376 by pin-and-slot connections 507, 508. Located coaxially within the tubular shaft 501 is a control shaft 509 (FIGS. 25, 28) in continuous driving engagement with the swing lever 467 (FIG. 26) through intermediate gears (not illustrated). The control shaft 509 carries a pinion 510 (FIGS. 25, 28) meshing with the rack portion 511 of a mode-control slider 512 which is likewise guided in the pin-and-slot guides 507, 508. The pinion 510 reciprocates the slider 512 during each machine run in the operating mode "addition." The drive of the control sliders 505 and 506 is dependent upon the angular adjustment of the coupling shaft 462 (FIG. 26), so that bars 505 and 506 are moved in accordance with the mode "addition," "subtotalizing," or "grand totalizing," depending upon the angular position of the coupling shaft 462. Rotatably fastened on the front side of the mode-control slider 512 (FIGS. 28, 25) is a coupling lever 514 by means of a pivot pin 513. The coupling lever 514 has a bifurcated entrainer 515 (FIG. 25) which can be placed into engagement with a pin 516 of a control lever 517. The control lever 517, whose arm 518 is biased by a pull spring 519, is mounted on a sleeve 520 (FIGS. 25, 22) rotatably journalled in the side wall 376. The same sleeve 520 also forms a journal for the control shaft 382 which, as described, carries the minus mechanism 386 and is axially displaceable. Another coupling lever 522 is secured by a pivot pin 521 to the mode-control slider 512 at a point above the coupling lever 514. The lever 522 has an entrainer 523 which can be placed into engagement with a switching pin 524 of a control lever 525 journalled on the side wall 376. The control lever 525 is connected by a link 526 with the control lever 527 of the sleeve 528. The sleeve 528 also receives the above-mentioned control shaft 383 for carrying and displacing the plus mechanism 387. Hung onto the pin 529 of the link 526 is a pull spring 530 whose other end is fastened to the side wall 376.

The mode-control slider 505, located beside the mode-control slider 512 (FIG. 25), carries on its side facing away from the side wall 376 (FIG. 28) two pivot pins 633, 534 engaged by respective coupling levers 531, 532 which cooperate with dog pins 516, 524 respectively (FIGS. 28, 25). The coupling lever 514 is connected by a link 535 with a feeler lever 536 rotatable on a bearing pin 538 of a carrier plate 537 (FIG. 29). The plate 537 is fastened to the side wall 376 by screw bolts 539 and spacer sleeves 540. The carrier plate 537 (FIGS. 29, 25) has a contour hole 541 through which the feeler pin 542 of the feeler lever 536 can pass, the feeler lever 536 being biased by a pull spring 543 and controlled by control sliders 544, 545 (FIGS. 29, 30, 31).

In the same manner, the coupling levers 522, 531 and 532 are connected by respective links 546, 547, 548 with spring-biased feeler levers 550, 551, 552 respectively. The feeler pins 553, 554, 555 of respective feeler levers 550, 551, 552 are likewise controlled by the control sliders 544, 545. The controlling cam profiles of the control sliders 544, 545 (FIGS. 25, 29, 30, 31) have the shape of teeth so as the form recesses 547, 558 and projections 556 which also occur in the guide slot 559 (FIG. 25) as recesses 560, 561. The feeler pins 542, 553 to 555 of feeler levers 536, 550, 551, 552 cooperate with these toothed cam profiles.

The control sliders 544, 545 are displaceably mounted and guided and for this purpose have slots 559 engaged by guide pins 562, 563 (FIG. 29) fastened to the side wall 376. The control sliders 544, 545 have respective rack portions 564, 565 (FIGS. 25, 29, 30, 31) meshing with respective pinions 566, 567 (FIGS. 25, 29). The pinion 566 is fastened on a shaft 568 (FIGS. 29, 26) driven by means of a pinion 426 from the differential mechanism 291 of the mode-control key bank 4 through the gear segment 440.

The pinion 567 is fastened on a shaft 570 journalled in the side wall 376 (FIG. 25). Fastened on shaft 570 is a pinion 572 (FIG. 32) meshing with a gear segment 574 rotatably mounted on a pivot pin 573. The gear segment 574 is connected by a linking rod 575 with the differential mechanism (not separately illustrated) of the adding-mechanism selector bank 5 in the same manner as illustrated in FIG. 26 and described above relative to the linking rod 436 and the differential mechanism 291 for the mode-control bank 4.

The selection of the totalizer (balance-drawing) mechanisms 434 (FIG. 25) as well as of the adding mechanisms 435, takes place in the same manner by the action of the mode-control slider 505 and the control sliders 544, 545.

The machine drive releasing means

The devices for releasing the machine drive and its blocking means are designed as follows. As mentioned, a releasing pawl member 355 and a latch pawl 374 are rotatably mounted on the shaft 193 (FIG. 11). They cooperate with a control member 576 (FIGS. 11, 33) which is controlled by a segment-like blocking member 578 and a lifting member (not illustrated). The member 578 and the lifting member act upon further control brackets 577, 579 and form part of a blocking subassembly 580 which is known as such (German Patent 964,905).

It will be remembered that the above-described releasing shaft 40 (FIGS. 7, 8, 9) has as many lateral pins 41 as the machine has banks of keys. Accordingly, the releasing shaft 40 in the embodiment here exemplified, is provided with five pins 41 for the amount-key banks 3 and with a sixth pin for the mode-control bank 4 and a seventh pin for the adding-mechanisms selector bank 5. The releasing shaft 40 coacts with the blocking assembly assembly 580 and with the stop sliders 32, 373 of the amount-key bank 3, the mode-control bank 4 and the selector bank 5. Such cooperation is effected by the pins 41 protruding between the pins 38 and 39 (FIG. 5) of the stop sliders 32 and 373 while a control segment 583 fastened on the release shaft 40 is articulately joined by a link 584 with the releasing segment 585 of the blocking assembly 580.

A pull rod 586 (FIG. 33) is linked to control segment 583 beside the link member 584 and is articulately connected with an angular lever 587 pivoted on a stationary shaft 588. A pusher rod 589 connects the angular lever 587 with a clearing lever 590 rotatable on a pivot pin 591. The clearing lever 590 possesses a hook-shaped cam contour 592 cooperating with a roller 593 which is fastened on a spur gear 595 by means of a pin 594. The spur gear 595 is fixed on the machine main shaft 121 and is rigidly joined with a cam disc 597 likewise engaged at pin 599 by a roller 598. A latch lever 601 rotatable on the shaft 588 has a nose 602 engaging a catch 603 of a coupling 604 which elastically connects a spur gear 605 with another spur gear 606. The spur gears 605 and 606 are coaxially mounted on a common shaft 607. The latch lever 601 is further provided with a semicircular stop 608 and with a roller 609 journalled on a pin 610. A spring 611 fastened by a hook 612 to latch lever 601 tends to turn the latch lever 601 clockwise, but this is normally prevented by the cam contour 613 of the control segment 583 engaged by the roller 609. A linking rod 614 has two pins 615 and 616 by means of which it connects the latch lever 601 with a three-armed control lever 617 rotatable on shaft 591. The clockwise swinging motion of latch lever 601 is limited by a shaft 619 against which the stop 608 will abut. The control lever 617 has a latch arm 618 passing behind the projection 620 of the cam disc 597, while the control arm 622 enters temporarily into the action range of the roller 598. The drive motor 623 of the machine is switched on and off by a switching lever 624 which has a lateral portion passing through an opening 625 of the pusher rod 614. A pinion 626 on the shaft of motor 623 drives the machine main shaft 121 counterclockwise (FIG. 33) through a chain of spur gears 627, 628, 629, 630, 606, 605 and 595.

A pull spring 632 is mounted between a fixed pin 633 and the pin 631 of the releasing segment 581 engaged by the linking rod 584. The releasing segment 585 is rotatably mounted on the pin 634 of the blocking assembly 580 and is provided with a stop 635 which cooperates with a cam portion 636 of a control member 638 fastened on the releasing shaft 637. The releasing shaft 637 is controlled by a cam through the control brackets 576, 577 and 579 (as is more fully described in the above-mentioned German Patent 964,905).

*Operation of the machine*

The performance of the machine as described so far is as follows.

Assume, for example, that the business transactions to be registered are those apparent from the sales check illustrated in FIG. 19. The first sale to be registered relates to the grocery department and involves an amount of $2.45. Accordingly, the clerk first posts the amount of $2.45 into the amount-key banks 3 (FIG. 2). He then releases a machine run by depressing the "grocery" key 14 in the adding-mechanism selector bank 5. The ensuing machine run enters the posted amount into the adding mechanism assigned to the grocery department. This operation as well as the accompanying other registering operations take place as follows.

During the machine run released by actuation of the key 14, the control bracket 579 (FIGS. 11, 33) swings the projection 636 out of the path of the stop 635 on the releasing segment 585, so that the releasing segment 585 turns counterclockwise about the pivot 635 under the action of the pull spring 632. During this turning motion, the control segment 583 and the releasing shaft 40 connected therewith likewise turn in the same sense, while the pins 41 block the stop sliders 32, 373 of all key banks. While the control segment 583 is being swung out, the lifting rod 586 turns the angular lever 578 clockwise. This movement of angular lever 587 is transmitted by the pusher rod 589 to the clearing lever 590 which is turned clockwise, thus placing the hook-shaped stop 592 into active position. The latch lever 601 is moved abruptly by spring 611 out of the catch recess 603 of the coupling 604 because the latch lever 601 is no longer retained by the contour 613 of the control segment 583. The stop 608 of lever 601 hits against the shaft 619, and the roller 609 catches behind the contour 613 of control segment 583 and prevents its return motion. Consequently the coupling 604 is now active. The pusher rod 614 transmits the motion of the latch lever 601 to the three-armed control lever 617 and, by means of the opening 625 and the switching lever 624, simultaneously causes the drive motor 623 to be switched on. The control lever 617 turns clockwise. The latch arm 618 releases the machine main shaft 121, and arm 622 moves to its working position. Now the motor 623, acting through the transmission gear 626 to 630, 605, 606 and 595, drives the machine main shaft 121 counterclockwise for performing a machine run.

At the beginning of the machine run the differential mechanisms 120 (FIG. 3) correlated to the amount-key banks 3, scan the setting of the amount keys 6, 7 by means of the bank sliders 103 and correspondingly adjust the control segments 263 of the respective computer mechanisms (FIGS. 21, 22).

The simultaneously starting differential mechanism for the selector bank 5 (which is not separately illustrated but is designed and operative in exactly the same manner as the differential mechanism 120 for the amount-key banks shown in FIG. 16) actuates the pull rod 575 (FIG. 32) and thereby turns the driving segment 574 whose pinion 572 adjusts the control slider 544 (FIGS. 25, 28) through the shaft 570 and the pinion 567, whereas the control slider 545, being under control by the differential mechanism 291 (FIG. 26) of the mode-control bank 4, remains in the position shown in FIG. 25. During such adjusting operation of the control slider 54, the feeler pin 542 of the feeler lever 536, biased by the pull spring 543, glides on the cam contour of the control slider 554. In the position of the differential mechanism for selector bank 5, determined by the depressed control key 14, the feeler pin 542 can drop into one of the recesses 561. When this happens, the feeler lever 536 pulls the coupling lever 514 by means of the linking rod 535 in the counterclockwise direction about its pivot 513 (relative to FIG. 25) until the bifurcated entrainer 515 straddles the pin 516 of the control lever 517. Now the coupling connection between the mode-control slider 512 and the control shaft 382 and the minus mechanism 386 connected to shaft 382 is established. The corresponding coupling of the plus mechanism 387 is effected in the same manner by the action of the feeler lever 550, the link 546, the coupling lever 522, the pin 524 of the control lever 525, the link 526, the lever 527, the sleeve 528 and the control shaft 383 carrying the plus mechanism 387.

The adding mechanism 435 serves, for example, to register sales items that are not subject to discount and is coupled in the same manner with the mode-control slider 505, whereas the sum-registering mechanism 434, which registers the additive amounts of the individual business transactions, remains in uncoupled condition.

When the key 14 is being actuated as described above, the cross pin 85 of the key, abutting against the inclined projection 84 (FIG. 14), displaces the control slider 82 toward the right, relative to FIG. 14. The control slider then acts upon lever 80, control shaft 78, angular lever 79, rod 88, lever 89, rod 90, lever 91 and control shaft 92 in order to turn the selector cam 100 (relative to FIG. 15) so that the feeler levers 408 and 409 are located opposite the raised "+" lobe of the selector disc 100.

At the beginning of the same machine run, the control levers 412, 413 are released and are caused by their respective springs 410, 411 to turn the feelers 408, 409 into feeling engagement with the plus-minus selector cam 100 then in its positive position. That is, the feeler levers 408, 409 move clockwise (FIG. 22) about their pivot pin 407 until they are stopped by the plus-minus selector cam 100. As a result, the bridge structure 403, displaceably mounted on bearing member 400, is shifted toward the right (FIG. 22) due to the action of the forked recess 416 of control lever 412, so that bridge 403 enters into the active range of the dog pin 422 on control shaft 421.

During the continuing rotation of the machine main shaft 121, the control shaft 421 (FIGS. 21, 25) is turned as already explained, so that by means of the likewise rotating pin 422, the bridge 403 is turned counterclockwise about pivot 397, together with the control lever 398 joined with the bridge 403, from the position shown in FIG. 22. During this motion the bearing member 427 displaces the control shaft 382 with the minus mechanism 386 toward the right relative to FIG. 22. As a result, the positive counting gear 380 of the minus mechanism 386 enters into the meshing range of gear segment 263 (FIGS. 22, 21); while the plus mechanism mounted on control shaft 383 remains in the positive position of engagement shown in FIG. 22, in accordance with the position of the appertaining feeler 409.

Since during the above-described machine run, the zero-stop pawl prevents the differential mechanism 131 of the mode-control bank 4 from operating, the latter mechanism does not effect any angular displacement of the coupling shaft 462 according to FIG. 26. Consequently, the shaft 462 remains in the initial mid-position ("addition"). The swing lever 468 for the mode "addition," acting through the mode-control shaft 501 (FIG. 25), effects an upward and downward motion of the mode-control sliders 505 and 506 during the continuing machine run in the mode "addition." During this operation, the mode-control slider 512 turns the control shafts 382, 383 and thus swings the plus-minus mechanisms 387, 386, connected with the latter shafts, into meshing engagement with the respective gear segments 263. The positive counting gears 380 of the plus mechanism 387 and the positive counting gears 380 of the minus mechanism 386 are thus placed into active meshing engagement. In the same manner, the adding mechanism 435 is swung into active engagement.

When this engagement is accomplished, and still during the first portion of the machine run, the differential mechanisms 120 of the amount-key banks 3, which scan the depressed amount keys 6 and 7 in each digit bank, transfer during their return motion the felt-off numerical values onto the gear segments 263, thus transmitting the numerical setting also into the counting gears 380 of the plus-minus mechanisms and the corresponding counting gears (not shown) of the adding mechanism 435.

It will be apparent from the foregoing that the amount of $2.45 posted into the machine, aside from being entered into the adding mechanism selected by the "grocery" key 14, is also entered through the respective positive counting gears 380 into the minus mechanism 386 and into the plus mechanism 387 of the computers.

Since the minus mechanism 386 in its zero condition occupies on the positive side the position 9999.99, the entering of the amount $2.45 causes a tens transfer in the highest digit position, namely an advance from position "9" to position "0." As a result, the cam 385 in the highest digit position, cooperating with the pin 389 of the control bridge 390 rotatably mounted on control shaft 382, turns the cam 385 counterclockwise to the position shown in FIG. 11. This causes the bridge structure 390 to also turn the control lever 391 counterclockwise, so that the guide lever 395 is likewise turned during the swinging-out motion of the minus mechanism 386 which occurs before the machine run is terminated. The lever 395 (FIG. 11), then acting through the link 394, turns the stop control member 336 about its pivot 337. This places the lug 335 into the path of the stop 307 on the bank slider 297 of the mode-control bank 4.

Shortly before termination of the machine run, the latch lever 420 is lowered onto the switch levers 412, 413 (FIG. 22) and thus turns the feelers 408, 409, connected with the switch levers, out of the range of the plus-minus selector cam 100 in opposition to the force of springs 410, 411.

The differential mechanisms 120 (FIG. 4) of the amount-key banks 3 and the selector bank 5 act, by means of their respective gear segments 163, upon the spur gears of the tubular shafts 211 which, in turn, cause their respective spur gears 213 (FIG. 18) to set the printing-type wheels 217, 218, 219 for imprinting a check, a recording tape and, if desired, a voucher. After the first transaction item is thus imprinted, the check tape 243 (FIG. 18) is advanced one step by the feed roller 254.

When the machine main shaft 121 (FIG. 33) has almost completed its revolution, the roller 598 hits upon the arm 622 of the control lever 617 and moves it counterclockwise. This shifts the stop arm 617 toward the cam disc 597 and into the path of the cam front 620. As a result, the cam 597 is stopped by the detent arm 618 upon completion of a full rotation. Simultaneously the pusher rod 614 transmits the motion of control lever 617 to latch lever 601 while tensioning the spring 611, and thus turns the latch lever 601 back to the latching position, so that the roller 609 passes out of the swinging range of the switching segment 583, the latter being biased by the pull spring 632. Due to the inertia of the motor 623, the machine main shaft continues running for some additional time although the opening 625 has released the switching lever 624. The roller 593 now reaches the cam contour 592 of the release lever 590 and turns it counterclockwise. By means of the transmission members 589, 587, 586, the control segment 583 is turned back clockwise to such an extent that the releasing shaft 40 causes its pins 41 to displace the latch sliders 32, 373 to the right relative to FIG. 5 for releasing all previously depressed keys. The control bridge 579 (FIG. 33) of the blocking assembly 580 is simultaneously returned to the starting position shown in FIG. 33 by means of the above-mentioned lifting member (not illustrated).

The first amount-entering machine run concerning a "grocery" item in the amount of $2.45 is now completed and the machine is ready for the posting of a series of further amounts to be registered.

According to the transactions apparent from FIG. 19, the next item to be registered is an "R" item in the amount of $2.50. The letter "R" may denote any item that is not subject to discount of any kind, for example in form of discount stamps, and it may be assumed that the second item to be posted concerns the sale of cigarettes. Accordingly, the sale amount of $2.50, after being posted by the clerk by means of the amount keys 6 and 7 in banks 3, is to be entered by depression of the "R" key 13 in the adding-mechanism selector bank 5. After thus entering the second item, the clerk proceeds analogously with posting and entering the further items apparent from FIG. 19, involving the amounts of $4.25, $5.12, $1.75, $6.48, $3.00 and $4.65. These amounts are all posted into the machine by means of the amount keys 6, 7 and are then entered by actuating the properly selected control keys 11 to 14 in the selector bank 5. Each time the ensuing machine performance is analogous to the one described above with reference to the posting and entering of the first item, except that the special items designated by "R" (as being not subject to discount), entered by means of selector key 13, are not charged into the adding mechanism 435.

After all individual items according to FIG. 19 are registered, the clerk determines the amount due from the customer. This is done by actuating the control key 8 in bank 4. Since the sum of the individual items, including those subject to discount as well as those not subject to discount, is always a positive value, the total amount to be determined is to be drawn by a subtotalizing operation from the positive side 380 of the plus mechanism 387, so that the plus mechanism 387 illustrated in FIG. 22 remains in the position shown.

When the key 8 in mode-control bank 4 is being depressed, the just-mentioned subtotalizing machine run is released by means of the control segment 583 (FIG. 33) under control by the bridge member 577. As a result, the control slider 545 (FIGS. 25, 19) is displaced by the differential mechanism 291 of the mode-control bank 4 through link 436 (FIG. 26), lever 437, link 439, gear segment 440, pinion 426, control shaft 568 (FIGS. 26, 25) and pinion 566 (FIG. 25). Such displacement of control slider 545 continues until the feeler pin 555 (FIG. 25) of feeler lever 552, acting through link 548, places the coupling lever 532 (FIGS. 25, 28) of mode-control slider 506 into engagement with the pin 524 of control lever 525 and thus couples the control shaft 383 (FIGS. 25, 22) and the plus mechanism 387 with the mode-control slider 506.

The above-mentioned actuation of the mode-control key 8 for subtotaling the previously registered individual sales items does not change the setting of the plus-minus selector cam 100 as illustrated in FIG. 15. Consequently, when the machine run is being started, the feeler lever 409 of the plus mechanism 387 abuts against the "+" top, and the feeler lever 408 of the minus mechanism 386 abuts against the "—" bottom on the cam contour of the selector cam 100. With this setting of feeler levers 408, 409 relatively to selector cam 100, the plus-minus mechanisms 386, 387 retain the position shown in FIG. 22. In this position, the positive counting gears 380 of the plus mechanism 387 and the negative counting gears 381 of the minus mechanism 386 are located opposite the respective computer-control segments 263.

During the starting interval of the differential mechanism 291 of the mode-control bank 4, the nose 307 of the bank slider 297 (FIG. 11) runs in front of the lug 335 of the swung-in control member 336. Simultaneously, the differential mechanism 291, acting through the gear segment 440 (FIG. 26) and the spur gear 443, turns the control segment 444 counterclockwise until the feeler pin 449 of feeler lever 450 is located at the cam-lobe periphery 446 between the cam recesses 447 and 448 of the control segment 444. By means of the control lever 456 the feeler pin 449 is then placed into contact with the contour 446, while the squared coupling shaft 462 is swung to the right-hand position shown by dot-and-dash lines in FIG. 26. The shaft 462 thus establishes a coupling engagement with the cam pair 477, 478 on main shaft 121. During the further course of the same machine run, this cam pair acts through swing lever 467, coupling shaft 462, switching bridge 465, arm 486, gear segment 487 (FIG. 28), gear 500, tubular shaft 501, and gear 502 (FIG. 25) to move the mode-control sliders 505 and 506 in accordance with the mode "subtotal."

During this operation the plus mechanism 387 (FIG. 22) coupled with the mode-control slider 506, is swung into engagement with the computer control segments 263 during the first half portion of the machine run so that the positive counting gears 380 are in engagement with the computer control segments 263. The segments 263, driven from the differential mechanism 120 of the respective amount-key banks 3 as described above, operate during the first initial amount of rotation of the machine main shaft 121 to set the positive counting gears 380 of the plus mechanism to zero and simultaneously set the indicator 190 (FIGS. 1, 4) and the printer 212 (FIG. 18) to the drawn-off values, so that the clerk and the customer can read off the computed total of sales. The total amount of $32.20 is simultaneously printed upon the sales check 260 according to FIG. 19 and upon the recording tape 250 (FIGS. 1, 18).

The setting of the amount $32.20 remains preserved in the indicating mechanism 190 up to commencement of the next following machine run.

During the return motion of the computer control segments 263 back to their starting positions in the second half of the rotation performed by the machine main shaft 121, the drawn-off values are transferred back into the positive counting gears 380 of the plus mechanism 387, and thereafter the plus mechanism 387 is swung out of its position of engagement with the computer control segments 263 under control by the mode-control slider 206. The totalized amount of $32.20 is simultaneously entered into the sum-forming mechanism 434 and is printed on recording tape 250 (FIG. 18).

If the customer, in order to pay the indicated amount of $32.20, tenders a check or bill in the value of $50.00 (FIG. 19), the clerk posts this amount by means of the amount keys 6, 7 and then releases another machine run by again depressing the control key 8 in bank 4. This amount of $50.00 must be entered in the negative sense for the purpose of determining the difference between the payable amount and the amount tendered. The corresponding machine operations are as follows.

When the amount of $50.00 is being posted by depressing the amount keys 6, 7, the dog pin 42 on the control slider 33 (FIG. 6) of the first depressed amount key 6 or 7 acts upon the projection 43 of the control shaft 44 rotatable on the releasing shaft 40. The control member 48 (FIG. 10) of control shaft 44 pushes pin 51 of control slider 52 to the left relative to FIG. 10, in opposition to the force of return spring 57. Simultaneously, the control pin 63 of the control slider 52 pulls the control slider 65 likewise to the left relative to FIG. 12, until the stop 70 of the spring-biased control slider 64 is located in front of the control pin 71 of the control slider 72 and is in contact therewith, while the inclined projection 69 has reached beneath the cross pin 62 of the control key 8.

During the subsequent depression of the control key 8, mentioned above, a further displacement of the control slider 65 takes place. The stop 70 of slider 65, acting upon pin 71 of control slider 72, sets the control slider 72 to the outermost left position relative to FIG. 13. During this operation the blind key 68 (FIG. 12) is pulled downward (FIGS. 11 and 12) by the action of the key pin 67 engaging the profiled hole 66. Thus, the extension 334 of the blind key 68 enters into the path of the extension 304 on bank slider 297. Furthermore, the control slider 72 acts upon angular lever 79, rod 88, lever 89 and rod 90, to turn the plus-minus selector cam 100 counterclockwise relative to FIG. 15, so that the feeler levers 408 and 409, when the machine run commences, enter into contact engagement with the "—" profile, i.e. the contour bottom of cam 100, designating the active engagement position of the negative counting gears 381 of the plus mechanism and the minus mechanism 387, 386.

At the beginning of the machine run released by the control key 8, the coupling of the minus mechanism 386 and of the plus mechanism 387 to the mode-control slider 506 is effected under control by the differential mechanism 291 of the mode-control bank 4 (FIG. 26). This differential mechanism displaces the control slider 545 (FIGS. 25, 28) whereby the feeler levers 552 and 551, acting through links 548, 547, place the coupling levers 532, 531 into coupling engagement with the control pins 524, 516 of plus mechanism 387 and minus mechanism 386.

Simultaneously, the gear segment 440 (FIG. 26) turns the control segment 444 counterclockwise until the recess 447 is opposite the feeler pin 449 and, during the further machine run, the squared coupling shaft 462 is moved to the mid-position shown by full lines in FIG. 26. In this position, the cam pair 479, 480 drives the mode-control sliders 505, 506 in accordance with the mode "addition." In this mode, the second of the amount keys 6, 7 is felt-off by the differential mechanisms 120 during the first portion of the machine run, and the posted amounts are entered in the second portion of the machine run under control by the computer control segments 283 which transfer these amounts into the minus gears 481 of the plus mechanism 387 and the minus mechanism 386.

When the posted amounts are being entered into the minus mechanism 386, relating to the above-given numerical example, there again occurs a tens transfer in the highest digit 381 of the minus mechanism 386. After the subtotal is drawn in the above-described manner:

The positive side 380 of minus mechanism 386 is in position 003219,

The negative side 381 of minus mechanism 386 is in position 996780.

After the tendered amount of $50.00 is negatively entered as described above:

The positive side 380 of minus mechanism 386 is in position 999383,

The negative side 381 of minus mechanism 386 is in position 000616.

It will be realized that during the latter operation, the cam disc 385 in the highest digit position of the minus mechanism 386 (FIGS. 11, 22) has been turned to such an extent that the feeler pin 389 can drop into the recess 384 and thereby turns the control member 336 about its pivot pin 337 with the result that, when the minus mechanism 386 is placed into active engagement, the stop 335 can no longer enter into the path of the bank slider 297.

With this operation, the amount of $50.00 tendered by the customer appears in the indicating device 190 (FIGS. 1, 4) and is imprinted upon the sales check 260 according to FIG. 19.

Before the differential mechanism 291 of the mode-control bank 4 commences operating as described above, the control cams 198, 199 (FIG. 4) cause the calibrating detent lever 329 to turn counterclockwise. The swing member 358 then pulls the angular lever 357 downwardly (FIG. 11), and the pin 361 of lever 357 turns the double-armed lever 363 counterclockwise about pivot pin 343. During this operation, the control lever 342 is kept in the position shown in FIG. 11 due to pin 356 of angular lever 357 being held in slot 349. The gear segment 316 in differential mechanism 291, when commencing its rotation, turns the spur gear 324 and thereby rotates the control disc 325 clockwise until the stop 371 of disc 325 is located beneath the pin 365 of lever 363.

When the adjusting motion of the differential mechanism 291 is terminated, the nose 327 (FIG. 11) of the calibrating detent lever 329, controlled by cams 198 and 199, again drops between the teeth of the gear segment 316. Simultaneously, the angular lever 357 is moved upwardly relative to FIG. 11, and the pin 365 of lever 363, acted upon by pull spring 369, abuts against stop 371 of control disc 325. The release lever 342, released by the pin 356, turns to its mid-position under the action of pull spring 367. In this mid-position of lever 342, the pin 356 of angular lever 357 can enter into the middle slot 348 of the release lever 342, and the stepped stop 339 on arm 341 of release lever 342 enters into the path of edge 338 on bank slider 297.

During turning of release lever 342 (FIG. 11) in the counterclockwise sense about pivot pin 343, the arm 352 of lever 342, acting through link 354, displaces the releasing pawl 355 clockwise about its shaft 193 so that the pawl swings out of the range of the control bridge member 578 that forms part of the blocking assembly 580, and the zero stop pawl 314 (FIG. 11) is held in swung-out position under control by the zero-pawl slider 303 attached to the pin 353.

In order to prevent the next following machine run from being automatically released by the control bridge member 576 (FIGS. 11, 33) of the locking assembly 580, with erroneously depressed amount keys 6 or 7, a lever 50 is provided at the control member 48 (FIGS. 11, 7) of the control shaft 44 and turns the latch pawl 374 (FIG. 11) into the path of the control bridge 577, thus latching the bridge member 576 when the amount keys 6 or 7 are depressed.

Shortly prior to termination of the machine run for entering the amount of money tendered, the plus-minus mechanisms 386, 387 are swung out of engagement, the control key 8 is released under control by the stop slider 373, and the control sliders 52 (FIG. 10), 65 (FIG. 12), and 72 (FIG. 13) return to the starting positions.

After the amount tendered by the customer is entered by means of the machine run just described, the amount of change to be paid back to the customer is registered in the machine by another machine run which, by virtue of the discriminating control means according to the invention, is automatically released by the bridge member 576. Generally, such release takes place in a manner similar to that described above with reference to the entering of sales amounts released by the control bridge member 579 under control by the keys of the adding-mechanism selector bank 5, namely as follows.

At the beginning of the change-computing and registering run, the differential mechanism 291 of the mode-control bank 4, during its first portion of operation, displaces the bank slider 297 to the left relative to FIG. 11 until its front edge 338 abuts against the stepped stop 339 of the release lever 342. Simultaneously, the plus mechanism 387 is coupled to the mode-control slider 512 which, as explained, is being moved in accordance with the mode "addition." This coupling is effected by means of gear segment 440 (FIG. 26), control slider 545 (FIG. 28), and feeler lever 550 (FIG. 25) through link 546 and coupling lever 522. Also at the same time, the feeler lever 550, acting through link 547 and coupling lever 531, couples the minus mechanism 386 to the mode-control slider 506 which in the present machine run is being moved in the mode "balance"-drawing ("grand total").

During the balance-drawing or totalizing machine run now being described, the plus-minus selector cam 100, not affected by the control slider 72, again assumes the position illustrated in FIG. 15. Now the positive counting gears 380 of the plus mechanism 387 and the negative counting gears 381 of the minus mechanism 386 are in engaging position relative to the respective computer control segments 263 as illustrated in FIG. 22.

Also at the same time the gear segment 440 turns the control segment 444 counterclockwise until the lower recess 448 (FIG. 26) is located opposite the feeler pin 449 on feeler lever 450, whereby the coupling shaft 462, during the further machine run, is swung to the left-hand position relative to FIG. 26.

In this position, the cam pair 481, 482 is coupled with the mode-control sliders 505, 506 and moves them in accordance with the mode "balance-drawing." In this operation the negative gears 381 of the minus mechanism 386 are swung into mesh with the computer control segments 263 shortly after completion of the selecting operations, and then take off the difference amount of $17.80. The plus mechanism 387, coupled with the mode-control slider 512, has its positive gears 380 swung into engagement with the computer control segments 263 only in the second half of the machine run, and the drawn-off amount of $17.80 is transferred into the plus mechanism when the segments 263 are thereafter rotated back to the starting position.

As a result, the minus mechanism on its ngative side 381, and the plus mechanism 387 on its positive side 380 are reset to zero. Consequently, the minus mechanism on its positive side 380 again occupies the position 9999.99, and the plus mechanism on its positive side 380 occupies the position 0000.00.

The final amount of $17.80, taken from the negative side 381 of the minus mechanism 386 and to be paid back to the customer, also appears in the indicating mechanism 190 and is imprinted upon the sales check 260 according to FIG. 19.

Now, still another machine run follows for the purpose of determining the amount that is subject to discount and concerns all items of the business transaction other than those designated by the letter "R" and entered into the adding mechanism 435 (FIG. 25) under control by selector key 13 in bank 5. This further machine run is also automatically released and is prepared and initiated while the totalizing operation for determining the amount of change is still being completed, such automatic sequencing being also effected by the discriminating control means according to the invention together with further discriminating control means as follows.

During the above-described machine run for determining the amount of change, the gear segment 316 in differential mechanism 291 turns the control disc 325 (FIG. 11) clockwise until the stop 372 is positioned beneath the pin 365 of lever 363. Consequently, the release lever 342 again turns the pawl 355 clockwise, and the stop 340 of release lever 342 can cooperate with the bank slider 297 during the next following machine run. The release of the following machine run is again effected by the bridge member 576 of the blocking assembly 580 (FIGS. 11, 33) in the same manner as described above relative to the balance-drawing operation for determining the amount of change. By means of the control slider 545, adjustable from gear segment 440 (FIG. 26) through control shaft 568, the adding mechanism 435 (FIG. 25) is coupled with the mode-control slider 505. A balance-drawing machine run is initiated by the control segment 444 adjusted from the gear segment 440 (FIG. 26). During the latter run, the adding mechanism 435 is felt-off by the computer control segments 263 of mechanism 435, and the total amount of $22.95 subject to discount is thus drawn from adding mechanism 435. This amount appears in the indicating device 190 and is transferred to the printing mechanism 212 (FIG. 18) and thus imprinted upon the separable portion of the sales check shown in FIG. 19.

During starting of the differential mechanism 291 (FIG. 11) the control disc 335 is turned further in the clockwise sense so that the pin 365 of lever 363 enters into contact with the contour 370 of the control disc 325 during the last-mentioned machine run, thus turning the stop pawl 355 back to the latching position shown in FIG. 11 so that the control bridge member 576 cannot again drop off.

At the termination of this machine run, the imprinted sales check 260 (FIG. 19) is perforated and cut off, whereafter it can be removed through the ejector opening 259 of the machine. The machine is now ready for registering of further business transactions.

However, if the amount paid by the customer and posted into the machine is smaller than the subtotal of $32.20, then the machine run released by actuation of the control key 8 for entering the amount tendered, does not result in the occurrence of tens switching in the highest negative digit position 381 of the minus mechanism 386. Consequently, the feeler pin 389 (FIG. 11) cannot drop into the recess 384, and the stop pawl 335 remains in the path of the bank slider 297 when the minus mechanism 386 is swung into engagement with the computer control segments. After termination of the machine run for entering the amount paid by the customer, during which the control key 8 and the blind key 68 are again released, there occurs, under control by the control disc 325 and the bridge member 576, an automatically released machine run. Then the bank slider 297 places its projection 307 in contact with the stop 335 of the control member 336. Caused by this setting of the bank slider 297, and in contrast to the operation described above with respect to the entering of a tendered amount greater than the subtotal registered, another subtotalizing machine run is released. Assume that the amount paid by the customer was $30.00. In this case, the last-mentioned subtotalizing run determines an amount of $2.20. The latter amount is indicated and imprinted. Thereafter, the machine is again blocked by the releasing pawl 355 under control by the control disc 325 against whose circular contour 370 the pin 365 of the double lever 363 now abuts. It is therefore necessary to again post and enter into the machine an amount paid which is equal to, or larger than, the residual amount of $2.20 now indicated by the machine. Only if this is done can another tens transfer occur in the highest negative digit position 381 of the minus mechanism 386, thus placing the stop 335 out of the path of the bank slider 297 so that the bank slider 297, during the further machine run, can advance up to the stepped stop 339 of the release lever 342 for registering the amount of change and also, as the case may be, the sum of the items subject to discount.

It will be understood, therefore, that after all individual items of a multiple-item transaction are entered and added by a subtotalizing run, the machine according to the invention automatically operates discriminatingly to add one or more machine runs in a mode-of-operation selected in accordance with what is necessary or desirable in the particular case to continue or conclude the registering and computing operations, thus requiring a minimum of manual control keys as well as a minimum of attention by the clerk.

If desired, the adding-mechanism selector bank 5 may be provided with a selector key by means of which negative amounts can be posted into the machine, for example refunds for packaging material being returned, refunds for discount or savings stamps, bottles, or the like. This key must move the adding-mechanism selector slider 82 to the left, relative to FIG. 14; consequently, the inclined cam contour of the slider cooperating with the latter key must have a direction opposed to that of the projections 84 shown in FIG. 14.

*Modification shown in FIGS. 20 and 34 to 36*

The cash-register control devices in the embodiment so far described automatically compute the amount of change and also issue a sales check in conjunction with a preferably severable stub or check portion, showing only the sum of the items subject to discount according to FIG. 19, this entire performance being controlled by a single control key 8 of the mode-control bank 4. The control devices, however, can be simplified in cases where a discount is applied to all goods or to none of the goods being sold. In this case, the second automatic sum-drawing operation for determining the sum of all discount items and producing an impression of that sum can be eliminated. The modifications then applicable in the machine otherwise as described above will be set forth presently with reference to FIGS. 20, 34 to 36.

As is apparent from the example of a sales check 261 shown in FIG. 20, only an automatically controlled balance-drawing (grand-totalizing) operation for determining the amount of change, namely $17.18, is to follow the entering of the paid amount of $50.00.

Accordingly, in this second embodiment it is only necessary to modify the control disc 325 according to FIG. 11, by eliminating the stop 372 from this disc. The disc then corresponds to the control disc 640 shown in FIG. 34. Aside from its circular contour 641, the control disc 640 has a single top lobe 642 of rectangular shape for cooperation with the pin 365 (FIG. 11) of the double-armed lever 363.

The three-armed control release lever 342 according to FIG. 11 is also to be modified for use in the second embodiment so as to correspond to the lever 643 shown in FIG. 35. This lever has two parallel slots 645, 646 joined by a larger opening 644. The slots cooperate with the pin 356 (FIG. 11) of the angular lever 357. In this embodiment, the control lever 643 acting upon the bank slider 297 has its arm 647 provided with only one stop. The keyboard of the modified machine corresponds to that shown in FIGS. 1 and 2 with the only exception that the control key 8 (FIG. 2) is substituted by the key 648 shown in FIG. 36. The key 648 is provided only with the designations "Oh" (change), "S" (sum), "Pd" (paid).

The invention, of course, is not limited to the embodiments illustrated but can be employed for all kinds of automatically releasable series or sequences of machine runs in any desired number in which different modes of machine operations (additions, subtotalizing, balance-drawing, etc.) are selectively performed in accordance with the requirements of a particular use, and are automatically controlled and released while corresponding computing mechanisms are likewise automatically selected and placed into active position.

It will further be understood by those skilled in the art, upon a study of this disclosure, that, relative to individual subassemblies and components as well as relative to the number of subassemblies and components, my invention permits of a great variety of modifications and hence can be given embodiments other than particularly illustrated and described herein, without departing from the essential features of my invention and within the scope of the claims annexed hereto.

I claim:

1. A business machine, comprising amount posting means, control key means for initiating a machine run to enter an amount tendered, computer means selectively operable in an additive and subtractive sense, transfer means operatively connecting said amount posting means with said computer means and selectively controllable by said control key means for entering into said computer means respective amounts posted by said amount posting means; selectively actuable automatic machine run control and release means including adding mechanism selector members under control by said control key means for setting said computer means, a differential mechanism having a mode switching bank slider member, rotatable control cam means arrestable at variable set positions at the end of respective machine runs and operably geared with said differential mechanism for actuation by said differential mechanism so as to be rotated thereby an amount determinative of one of said variable set positions, said rotatable control cam means being arrestable at said variable set positions at the end of respective machine runs dependent upon the position of said bank slider member, machine run mode selector means, detent means arranged for arresting said control cam means in one of said variable set positions, and discriminating release control means arranged for adjusting the position of said mode switching bank slider member and for controlling said adding mechanism selector members as well as said mode selector means in order to initiate a number of said variable series of machine runs, said number being at least one machine run and being determined by the arrested position of said control cam means as set by a preceding machine run.

2. A business machine, comprising a keyboard assembly having selectively actuable amount-posting keys and selectively actuable machine-run control keys, computer means, transfer means operatively connecting said amount-posting keys with said computer means and selectively controllable by said control keys for entering into said computer means respective amounts posted by said amount-posting keys, printing and indicating means connected with said transfer means and computer means under control by said control keys for printing and indicating entered amounts as well as subtotals and balances drawn from said computer means, selectively actuable machine run control means for automatically controlling the machine to perform a subtotalizing and a balance drawing run respectively, said machine run control means comprising a differential mechanism having a bank slider member adjustable into various positions, and discriminating means comprising rotatable computer cam means controlled by said computer means, follower means engageable with said computer cam means, switching means connected to said follower means, and a movable control member linked to said switching means and mounted for engaging cooperation with said machine run control means to arrest said bank slider member in a predetermined one of said various positions for releasing said machine run control means to selectively perform one of said subtotalizing and balance-drawing runs in succession to and in dependence upon a given preceding machine operation.

3. A business machine, comprising a keyboard assembly having selectively actuable amount-posting keys and selectively actuable machine-run control keys, computer means, transfer means operatively connecting said amount-posting keys with said computer means and selectively controllable by said control keys for entering into said computer means respective amounts posted by said amount-posting keys, said control keys comprising a special key for controlling the machine to perform a subtotalizing run, selectively actuable machine run control means releasable independently of said control keys for automatically controlling the machine to perform a subtotalizing and a balance-drawing run respectively, said machine run control means comprising a differential mechanism having a bank slider member adjustable into various positions, and discriminating means comprising rotatable computer cam means controlled by said computer means, follower means engageable with said computer cam means, switching means connected to said follower means, and a movable control member linked to said switching means and mounted for engaging cooperation with said machine run control means to arrest said bank slider member in a predetermined one of said various positions for releasing said machine run control means to selectively perform one of said subtotalizing and balance-drawing runs in succession to and in dependence upon said precedingly occurring subtotalizing run.

4. A business machine, comprising a keyboard assembly having selectively actuable amount-posting keys and selectively actuable machine-run control keys, computer means selectively operable in additive and subtractive sense, transfer means operatively connecting said amount-posting keys with said computer means and selectively controllable by said control keys for entering into said computer means respective additive and subtractive amounts posted by said amount-posting keys, said computer means comprising change-computing mechanisms for forming the amount of change as the difference between entered additive amounts and an entered subtractive amount, said machine-run control keys comprising a special key for controlling said computer means to perform an item-adding operation, printing means connected with said transfer means and computer means under control by said control keys for printing entered amounts as well as subtotals and balances drawn from said computer means, discriminating control means having second control means operably connecting same with said computer means, said discriminating control means having means causing a selective operation thereof to release a totalizing machine-run dependent upon a computed result in said computer means being a negative amount.

5. A business machine, comprising a keyboard assembly having selectively actuable amount-posting keys and selectively actuable machine-run control keys, computer means, transfer means operatively connecting said amount-posting keys with said computer means and selectively controllable by said control keys for entering into said computer means respective amounts posted by said amount-posting keys, said control keys having one and the same key for initiating an individual machine run as well as a machine-run sequence including at least one automatically released run, printing and indicating means connected with said transfer means and computer means under control by said control keys for printing and indicating entered amounts as well as subtotals and balances drawn from said computer means, selectively actuable machine run control means for controlling the machine to perform a subtotalizing run and a balancing run selectively, said machine run control means comprising a differential mechanism having a bank slider member adjustable into various positions, and discriminating means comprising rotatable computer cam means controlled by said computer means, follower means engageable with said computer cam means, switching means connected to said follower means, and a movable control member linked to said switching means and mounted for engaging cooperation with said machine run control means to arrest said bank slider member in a predetermined one of said various positions for releasing said machine run control means to selectively perform one of said subtotalizing and balance-drawing runs in succession to and in dependence upon a given subtotalizing run initiated by said one control key.

6. A business machine, comprising a keyboard assembly having selectively actuable amount-posting keys and selectively actuable machine-run control keys, computer means, transfer means operatively connecting said amount-posting keys with said computer means and selectively controllable by said control keys for entering into said computer means respective amounts posted by said amount-posting keys, registering means connected with said transfer means and computer means under control by said control keys for registering entered amounts as well as subtotals and balances drawn from said computer means, selectively actuable control means for automatically controlling the machine to perform a subtotalizing and a balance-drawing run respectively, and discriminating means controlled by said computer means and connected with said control means for releasing said control means to selectively perform one of said subtotalizing and balance-drawing runs in succession to and in dependence upon a given preceding machine operation, said machine including second control means connecting said discriminating means with said computer means, said discriminating means having means causing a selective operation thereof dependent upon a result computed in said computer means and transmitted by said second control means.

7. A business machine, comprising a keyboard assembly having selectively actuable amount-posting keys and selectively actuable machine-run control keys, computer means selectively operable in additive and subtractive sense, transfer means operatively connecting said amount-posting keys with said computer means and selectively controllable by said control keys for entering into said computer means respective additive and subtractive amounts posted by said amount-posting keys, said computer means comprising change-computing mechanisms for forming the amount of change as the difference between entered additive amounts and an entered subtractive amount, said machine-run control keys comprising a special key for controlling said computer means to perform an item-adding operation, printing means connected with said transfer means and computer means under control by said control keys for printing entered amounts as well as subtotals and balances drawn from said computer means, and discriminating release control means for automatically controlling the machine to perform a totalizing run in dependence upon said item-adding operation resulting in a negative amount, said machine comprising control mechanism means intermediate said special key and said computer means for selectively subtotalizing entered items and for releasing an adding run for entering a tendered amount under control by said same special key; second control means connecting said discriminating means with said computer means, said discriminating control means having means causing a selective operation thereof dependent upon completion of said adding run to automatically release a balance-drawing run for registering the amount of change.

8. A business machine, comprising a keyboard assembly having selectively actuable amount-posting keys and selectively actuable machine-run control keys, computer means selectively operable in additive and subtractive sense, transfer means operatively connecting said amount-posting keys with said computer means and selectively controllable by said control keys for entering into said computer means respective additive and subtractive amounts posted by said amount-posting keys, said computer means comprising change-computing mechanisms for forming the amount of change as the difference between entered additive amounts and an entered subtractive amount, said machine-run control keys comprising a special key for controlling said computer means to perform an item-adding operation, printing means connected with said transfer means and computer means under control by said control keys for printing entered amounts as well as sub-totals and balances drawn from said computer means, and discriminating release control means for automatically controlling the machine to perform a totalizing run in dependence upon said item-adding operation resulting in a negative amount, control mechanism means intermediate said special key and said computer means for selectively subtotalizing entered items and for releasing an adding run for entering a tendered amount under control by said same special key; second control means connecting said discriminating means with said computer means, said discriminating control means having means causing a selective operation thereof dependent upon completion of said adding run to automatically release a balance-drawing run for registering the amount of change, said computer means comprising an adding mechanism correlated to a given group of special business transactions, said control keys comprising a particular key for controlling said transfer means to also enter posted amounts into said adding mechanism, further discriminating control means for automatically releasing a subtotalizing run, said latter control means being dependent upon actuation of said particular key and releasable in response to completion of said balance-drawing run for automatically registering the sum of said special transactions.

9. A business machine, comprising a keyboard assembly having selectively actuable amount-posting keys and selectively actuable machine-run control keys, computer means selectively operable in additive and subtractive sense, transfer means operatively connecting said amount-posting keys with said computer means and selectively controllable by said control keys for entering into said computer means respective additive and subtractive amounts posted by said amount-posting keys, said computer means comprising change-computing mechanisms for forming the amount of change as the difference between entered additive amounts and an entered subtractive amount, said machine-run control keys comprising a special key for controlling said computer means to perform an item-adding operation, printing means connected with said transfer means and computer means under control by said control keys for printing entered amounts as well as subtotals and balances drawn from said computer means, and discriminating release control means for automatically controlling the machine to perform a totalizing run in dependence upon said item-adding operation resulting in a negative amount, a movable control member and transmission means connecting it with said computer means for positionally controlling said control member from said computer means, a blind key displaceable under control by said amount-posting keys and said special control key, a movable release member and a rotatable control disc in coactive connection with said release member for controlling it, said discriminating control means being under joint control by said control member and blind key and said movable release member.

10. In a business machine according to claim 9, said movable releasing member having a plurality of stops for releasing respective machine runs, and said control disc having a plurality of cam portions for selectively adjusting said release member in accordance with respectively different modes of operation performed during the machine run.

11. A business machine according to claim 10, comprising a machine blocking assembly having a control member for unblocking the machine, said release member being connected with said latter control member for actuating it when releasing a machine run.

12. A business machine according to claim 9, comprising a registering printer assembly having type wheels and a driving segment for adjusting said wheels, a rotatable drive means in power transmitting connection with said segment for driving the latter, said control disc for said discriminating control means being fastened to said drive means to rotate together therewith.

13. A business machine according to claim 9, comprising a movable cam follower in engagement with said control disc, said release member being in spring-biased engagement with said follower so as to be displaced thereby due to rotation of said control disc.

14. A business machine according to claim 13, comprising a calibrating mechanism intermediate said cam follower and said release member and in contour-constrained engagement with said release member.

15. A business machine according to claim 13, comprising a main drive shaft having control cams mounted thereon, a calibrating mechanism intermediate said cam follower and said release member and in contour-constrained engagement with said release member, and linking means connecting said mechanism with said control cams for controlling said mechanism.

16. A business machine according to claim 10, comprising a machine blocking assembly having a blocking member for preventing automatic release of a machine run, and release control means connecting said amount-posting keys with said blocking member of said blocking assembly.

17. In a business machine according to claim 16, said blocking assembly comprising a releasing means for releasing said assembly to permit unblocking the machine, said assembly releasing means being in coactive control connection with said control member and said blocking member of said assembly.

18. A business machine according to claim 11, comprising a machine drive having a main shaft and a motor in driving connection therewith, switching means for controlling said motor to drive said main shaft for a machine run, said switching means having a spring-biased switching member and a movable switch-release control structure connected with said blocking assembly to be moved thereby to release said switching member for controlling said motor when said assembly responds to release by said release member.

19. A business machine, comprising amount-posting means and selectively actuable machine-run control means, computer means, transfer means operatively connecting said amount-posting means with said computer means and selectively controllable by said control means for entering into said computer means respective amounts posted by said amount-posting means, selectively actuable machine run control means for controlling the machine to perform a succession of machine runs, said machine run control means comprising a differential mechanism having a bank slider member adjustable into various positions, and discriminating means comprising rotatable computer cam means controlled by said computer means, follower means engageable with said computer cam means, switching means connected to said follower means, and a movable control member linked to said switching means and mounted for engaging cooperation with said machine run control means to arrest said bank slider member in a predetermined one of said various positions, said discriminating control means having selectively actuable manual setting means requiring only a single manipulation for initiating and discriminatingly selecting a predetermined one of said succession of machine runs.

20. In a business machine equipped with amount-posting means and with means for entering the posted amounts into the machine and having a mechanism for subsequently performing automatically a predetermined individual machine run followed by a variable series of machine runs in succession to and in dependence upon the result of said individual machine run, a machine run control device comprising manual setting means requiring only a single manipulation for determining said individual machine run as well as selecting the corresponding proper series of machine runs, said control device including a manually pre-adjustable displaceable control slider member, a pivoted control member having means for setting the position thereof, said control slider member and said pivoted control member both being in coactive connection with said manual setting means for effecting individual addition machine runs and subtotalizing machine runs, and automatic release control means in coactive connection with said manual setting means for initiating said series of machine runs.

21. In a business machine equipped with amount-posting keys and with means for entering the posted amounts into the machine and having a mechanism for subsequently performing a subtotalizing machine run and to subsequently perform a variable plural series of totalizing machine runs, a plus-minus computer mechanism, a sum-drawing control device under control by said computer mechanism, said sum-drawing control device including a displaceable control slider member, a movable control member having means for setting the position thereof, said control slider member and said movable control member both being in coactive connection with said manual setting means for effecting individual addition machine runs and sub-totalizing machine runs, and automatic release control means in coactive connection with said manual setting means for initiating said series of machine runs, said sum-drawing control device having means for automatically selecting a series of totalizing machine runs in dependence upon the result of the preceding subtotalizing run.

22. In a business machine equipped with amount posting means and with means for entering the posted amounts into the machine and having a mechanism for subsequently performing automatically a predetermined individual machine run followed by a variable series of machine runs in succcession to and in dependence upon the result of said individual machine run, a sum-drawing control device comprising manual setting means including a special purpose key, a mode switching bank slider member, releasing means arranged for actuating said bank slider member upon manipulation of said special purpose key, computer means selectively operable in additive and subtractive sense, adding mechanism selector members for setting said computer means, printing and indicating means operably connected with said computer means, machine run mode selector means having a differential mechanism, rotatable control cam means arrestable at variable set positions at the end of respective machine runs, gear means operably connected with said differential mechanism for actuation thereby to rotate said control cam means an amount determinative of one of said variable set positions, detent means engageable with said gear means for arresting said control cam means at said one position, and discriminating release control means arranged for adjusting the position of said mode switching bank slider member and for controlling said printing and indicating means and said adding-mechanism selector members as well as said mode selector means in order to initiate a number of said variable series of machine runs, said number being at least one machine run and being determined by the arrested position of said control cam means as set by a preceding machine run.

23. A business machine according to claim 22, said sum-drawing control device including a manually pre-adjustable displaceable control slider member, a pivoted control member having means for setting the position thereof, said control slider member and said pivoted control member both being in coactive connection with said manual setting means for effecting individual addition machine runs and subtotalizing machine runs, and automatic release control means in coactive connection with said manual setting means for initiating said series of machine runs.

References Cited by the Examiner

UNITED STATES PATENTS

| 2,972,442 | 2/61 | Goodbar | 235—7.11 |
| 2,974,860 | 3/61 | Werner | 235—7.11 |
| 3,015,437 | 1/62 | Dodsworth | 235—60.31 |
| 3,049,288 | 8/62 | Becker | 235—7 |
| 3,066,861 | 12/62 | Becker | 235—2 |

LEO SMILOW, *Primary Examiner.*